United States Patent
Ashizaki et al.

(10) Patent No.: US 6,829,430 B1
(45) Date of Patent: Dec. 7, 2004

(54) IMAGE RECORDING APPARATUS

(75) Inventors: Koji Ashizaki, Tokyo (JP); Akira Shirakura, Tokyo (JP); Nobuhiro Kihara, Kanagawa (JP); Shigeyuki Baba, Tokyo (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/385,136

(22) Filed: Aug. 30, 1999

(30) Foreign Application Priority Data

Sep. 2, 1998 (JP) .......................................... P10-248501

(51) Int. Cl.⁷ ................................................ H04N 5/91
(52) U.S. Cl. ..................................... 386/117; 386/107
(58) Field of Search .......................... 386/46, 107, 117, 386/96; 358/906, 909.1; 348/39, 208.15

(56) References Cited

U.S. PATENT DOCUMENTS

| | | | | | |
|---|---|---|---|---|---|
| 4,745,468 A | * | 5/1988 | Von Kohorn | ............... | 725/141 |
| 4,776,031 A | * | 10/1988 | Mita | ........................... | 382/323 |
| 5,262,867 A | * | 11/1993 | Kojima | ........................ | 348/39 |
| 5,550,586 A | * | 8/1996 | Kudo et al. | .............. | 348/222.1 |
| 5,726,819 A | * | 3/1998 | Kubo | ........................... | 358/906 |
| 5,881,321 A | * | 3/1999 | Kivolowitz | ................... | 396/53 |
| 6,476,861 B1 | * | 11/2002 | Min | ....................... | 348/208.15 |
| 6,628,325 B1 | * | 9/2003 | Steinberg et al. | ........ | 348/211.1 |

FOREIGN PATENT DOCUMENTS

| JP | 06-303474 A | * | 10/1994 |
| JP | 08-088825 A | * | 4/1996 |
| JP | 408179026 A | * | 7/1996 |

* cited by examiner

*Primary Examiner*—Huy Nguyen
(74) *Attorney, Agent, or Firm*—Rader, Fishman & Grauer PLLC; Ronald P. Kananen

(57) ABSTRACT

An image recording apparatus that can easily obtain a train of parallax images to be for preparing a holographic stereogram, without the necessity of laying rails. The apparatus comprises a camera and a position data recording section. The camera takes pictures of an object. The position data recording section for recording position data when the camera takes pictures of an object.

12 Claims, 20 Drawing Sheets

IMAGE RECORDING APPARATUS

BACKGROUND OF THE INVENTION

The present invention relates to an image recording apparatus designed to record a train of parallax images, each having parallax data.

A train of parallax images, each having parallax data, is used to prepare, for example, a stereoscopic which is know as holographic stereogram. A holographic stereogram is prepared in two steps. First, a camera takes many parallax images of an object, each taken at different observation point. Then, the parallax images thus taken, or original images, are recorded in the form of strip- or dot-shaped element holograms, on one hologram-recording medium.

More specifically, a holographic stereogram that has parallax data in respect to horizontal direction only is prepared as will be explained with reference to FIG. 1. First, a strip 301 of parallax images 302 of an object 300 is obtained. The parallax images 302 have been taken at different observation points. Each parallax image 302 has horizontal parallax data. If necessary, the images 302 are subjected to prescribed viewpoint transformation. Then, the parallax images 302 are recorded on a hologram-recording medium 303, in the form of strip-shaped element holograms. Thus, a holographic stereogram having horizontal parallax data is formed.

When an observer looks at the holographic stereogram with one eye, the holographic stereogram appears as a 2-dimensional image that is a collection of the parts of the element holograms. When the observer shifts his or her eye in the horizontal direction, the holographic stereogram appears as a 2-dimensional image that is a collection of the other parts of the element holograms. When the observer looks at the holographic stereogram with both eyes, the two 2-dimensional images are observed, which are slightly different since the eyes are spaced apart in the horizontal direction. As a result, the observer perceives parallax and sees a 3-dimensional (stereoscopic) image of the object 300. Such a holographic stereogram is disclosed in Japanese Patent Application No. 8-172381 (Jpn. Pat. Appln. Laid-open Publication No. 10-20756) and the like.

To prepare a train of parallax images, i.e., original images for such a holographic stereogram, straight or arcuate rails are laid and a camera is moved on the rails at a constant speed by using a pulse motor as drive source. While the camera is being so moved on the rails, it takes pictures of the object, one after another, from different angles. A train of parallax images, each having parallax data, is thereby obtained. The camera must be moved on the rails at a constant speed in the course of acquiring the train of parallax images, so that data showing the position where each picture is taken may be reliably obtained.

However, a complex apparatus is required to move the camera on the rails at a constant speed by means of a pulse motor used as drive source. The cost of preparing a train of parallax images is inevitably very high. Further, the camera as a whole has a large total weight, making it difficult to take pictures of a picture in any given place.

The camera may not be moved on the rails at a constant speed as is desired. Thus, the coordinates of the position where the camera takes a picture may deviate from the coordinates of the desired position of photographing. This results in errors when viewpoint transformation is performed on the train of parallax images. These errors will deteriorate the resultant holographic stereogram in quality.

SUMMARY OF THE INVENTION

The present invention has been made in view of the foregoing. The object of the invention is to provide an image recording apparatus that can easily obtain a train of parallax images to be used for preparing prepare a holographic stereogram, without the necessity of laying rails.

An image recording apparatus according to the present invention comprises a camera means and a position-data recording mans. The camera means takes pictures of an object. The position-data recording means records the position data representing the position where the camera means takes each picture.

The camera means may continuously takes a plurality of pictures, one after another, while it is moving with respect to the object. In this case, it is desired that the position-data recording means should record the position data items for all or some of pictures in association with the pictures, respectively. Each position data item represents the position where the camera means took the picture.

The image recording apparatus may further comprise time-data recording means for recording the time when the camera means takes a picture. The camera means may continuously takes a plurality of pictures, one after another, while it is moving with respect to the object. In this case, it is desired that the time-data recording means should record the time data items for all or some of pictures, in association with the pictures, respectively. Each time data item represents the time when the camera means took the picture.

The image recording apparatus may further comprise optical-system data recording means for recording the data about the optical system used in combination with the camera means to take pictures of an object. The means may continuously takes a plurality of pictures, one after another, while it is moving with respect to the object. If this is the case, it is desired that the optical-system data recording means should record the optical-system data items for all or some of pictures, in association with the pictures, respectively.

It is desired that the image recording apparatus further comprise alarm means. The alarm means generates an alarm, either visual or oral message, instructing the operator to move the camera means more slowly and/or start taking pictures again, if the camera mans is moved faster than a predetermined speed while taking pictures.

The image recording apparatus according to the invention can record position data, together with a train of parallax images. Hence, the camera means need not be moved at a constant speed to obtain the parallax images. It is therefore unnecessary to use a drive source, such as a pulse motor, to move the camera means. The apparatus can be therefore simple, light and inexpensive. In addition, no rails are required to guide the camera means. This renders it easy to take pictures of an object.

With the image recording apparatus according to the invention it is possible to determine the coordinates of any position of photographing, even if the camera means moves on the rails at a constant speed. When the images provided by the camera means are processed, generating a train of parallax images for preparing a holographic stereogram, the train of parallax images has no errors and are do not deteriorate in quality.

The image recording apparatus according to the invention can record time data, together with a train of parallax images. Hence, the time-series relation of each frame of image with another frame can be clearly determined. The time-series relation serves as an index in processing an original image to generate a train of parallax images for preparing a holographic stereogram. Further, the standard time data may be recorded, along with the parallax images, so that the time data may be seen in a holographic stereogram.

Still further, the data about the photographing optical system (view-angle data, focal distance data, exposure, diaphragm data, axis-change data, base rotation data, and the like may be recorded, too. In this case, the view angle, for example, need not be calculated and preset before the camera means start taking pictures of the object. It suffices to set parameters for converting images, after the camera means has taken pictures.

Moreover, the motion of the camera means is detected, and an alarm is generated if the camera means moves faster than a predetermined speed. This helps to prevent erroneous photographing. The alarm also instructs the operator to perform photographing again if the photographing first performed is not successful.

DETAILED DESCRIPTION OF THE INVENTION

Figure 1:
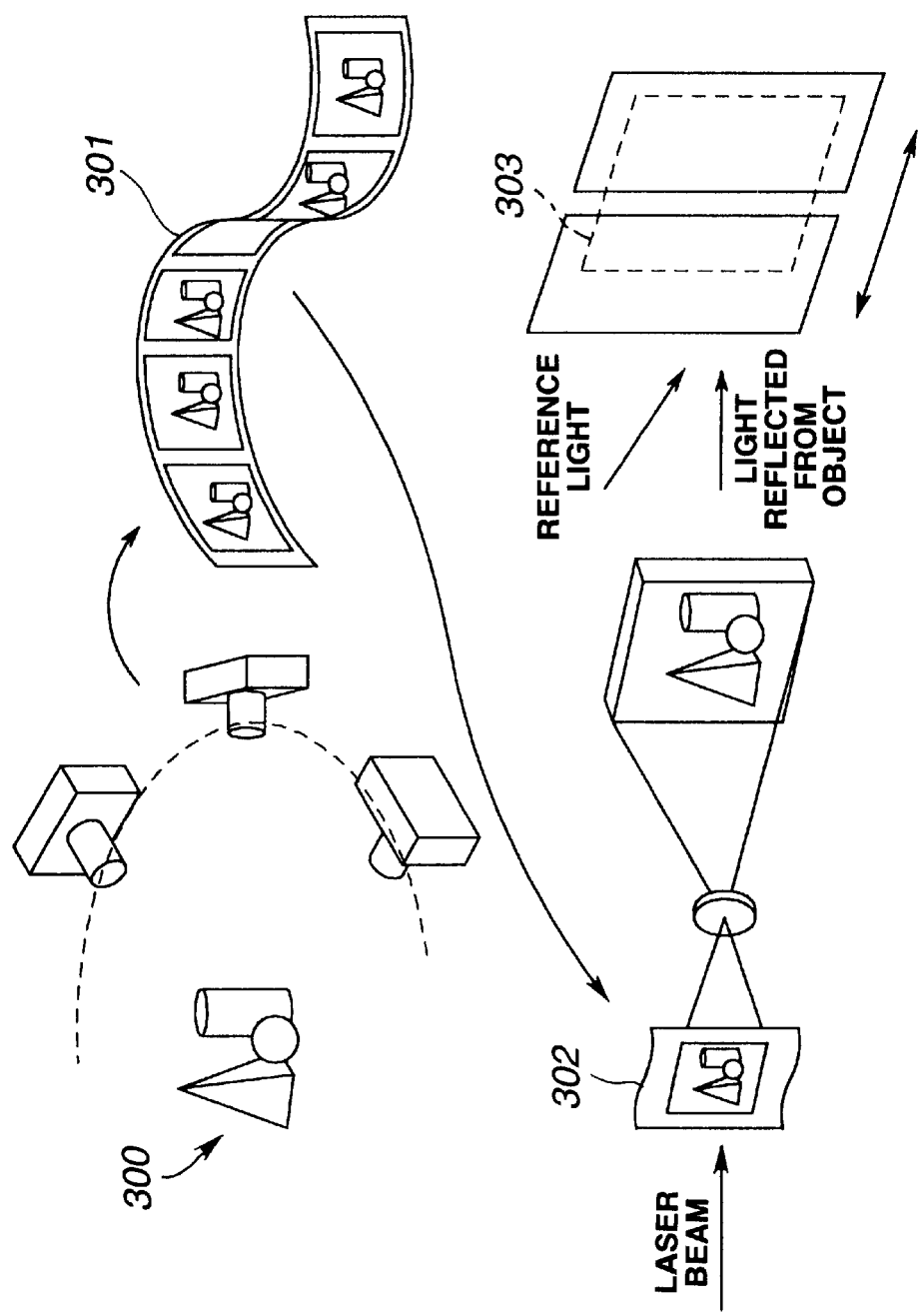
FIG. 1 is a schematic diagram for explaining a method of preparing a holographic stereogram.

Embodiments of the present invention will be described in detail, with reference to the accompanying drawings.

1. Brief Description of the Embodiments

An image recording apparatus according to this invention comprises a camera device and a position-data recording means. The camera device takes pictures of an object. The position-data recording means records the data representing the positions where the camera devices takes the pictures.

The position data represents the position at which the camera device takes the pictures. (Alternatively, the position data may show the positions at which the photographing optical system of the camera device are located when the camera device takes the pictures.) More specifically, an item of the position data represents the relative change and/or absolute change in position of the camera device in either a translational motion or a rotational motion. It should be noted that the relative change and the absolute change are interchangeable.

The relative change in position of the camera device in the translational motion can be detected by, for example, a magnetic scale, an optical scale, an accelerometer, or the like. These measuring devices are commercially available. An example of a magnetic scale is a Magnescale GB-A series scale, manufactured by Sony Precision Technology Co., Ltd. An example of an optical scale is a BS75A-series laser scale, manufactured by Sony Precision Technology Co., Ltd. An example of a accelerometer is servo accelerometer JA-5V, manufactured by Japan Airways Electronic Industries Co., Ltd.

Various method of detecting the absolute change in position of the camera device in the translational motion are known. One of these methods is to determine the latitude and longitude by means of a GPS (Global Positioning System) which utilizes electric waves emitted from artificial satellites. Another method is to detect the position of the camera device by using a source of modulated magnetic field and a pair of magnetic field sensors. Still another method is to detect the position of the camera device by using a source of modulated ultrasonic waves and a pair of ultrasonic wave sensors.

Various apparatuses for detecting the absolute change in position of the camera device in the translational motion are commercially available, too. Among these are PC-card navigation system PACY-CNV10, manufactured by Sony Co., Ltd., and 3-dimensional position sensor Jupiter (trademark), manufactured by Kabushiki Kaisha SPA (System Producer Associates). Another example of a 3-dimensional position sensor is 3SPACE-series Fastrack (trademark), manufactured by Pohymas, Inc., U.S.A.

The absolute change in position of the camera device in the rotational motion can be detected by a vibratory gyroscope, a laser gyroscope, or the like. A vibratory gyroscope detects the angle through which an object rotates, from feedback that a vibrating object generates when it is rotated. A laser scope detects the angle through which an object rotates, by applying two laser beams in a triangular or a circular optical path or fiber, in the opposite directions, and analyzing the interference of the se laser beam.

Commercially available measuring devices of this type are a piezoelectric vibratory gyroscope and a laser gyroscope. An example of the former is Gyroster (trademark) ENV-05A, manufactured by Kabushiki Kaisha Murata Seisakusho. An example of the latter is fiber optic gyroscope JG-108FD, manufactured by Japan Airways Electronic Industries Co., Ltd.

Various method of detecting the absolute change in position of the camera device in the rotational motion are also known. One of these methods is to determine the direction of rotation, on the basis of the direction of the geomagnetism. Another method is to detect an angle of inclination by means of an accelerometer, on the basis of the direction of gravity. Still another method is to employ a angle sensor, which is a combination of a vibratory gyroscope, and an acceleration sensor. A further method is to detect angular velocities by means of a piezoelectric vibratory gyroscope or a laser gyroscope, integrate the angular velocities thus detected, obtaining an angle, and compare this angle with an initial angle, or a reference angle.

Measuring devices are commercially available for effecting these methods of detecting the absolute change in position of the camera device in the rotational motion. An example of a magnetic sensor that detects the geomagnetism is the triaxial geomagnetic sensor HMR2300, manufactured by Honneywell, Inc, U.S.A. An example of an inclination sensor is the servo inclination sensor MC100L, manufactured by Japan Airways Electronic Industries Co., Ltd. An example of an angle sensor composed of a vibratory gyroscope and an acceleration sensor is the triaxial dynamical angle sensor, manufactured by Kabushiki Kaisha Data Tech.

The position data, thus generated by a sensor of any type described above, is recorded by the position-data recording means. It is desired that the position data be recorded, in association with the picture the camera device has taken at the position represented by the position data. More precisely, items of position data can better be recorded in the image (i.e., frames), respectively, if the camera means has continuously taken a plurality of pictures, one after another, while it is moving with respect to the object.

If the amount of data that can be recorded within a unit time is limited, the position-data recording means may record only the position data items for some of the pictures taken by the camera device, each data item in association with one picture. For example, the position data is recorded for every other two or more frames (pictures). Alternatively, the position-data recording means may record the data of translational motion and the data of rotational motion alternately, for every other frame.

In the case where the position data items are not recorded in association of all frames, respectively, any position data item not recorded may be interpolated from the immediately preceding position data item and the immediately following position data item, in the course of reproducing the frames. More precisely, position data items not recorded may be interpolated in time sequence, each from the preceding and following position data items, by means of either linear interpolation or spline interpolation.It is desirable that the image recording apparatus further comprise a time data recording means that records the time when the camera device takes a picture of the object. Thus, every time the camera device takes a picture, not only a position data item is recorded by the position-data recording means, but also a time data item is recorded by the time-data recording means, in the image recording apparatus.

The time data may be generated by a manually adjustable quartz oscillator. Nonetheless, it is more desirable to use the time data calibrated by the Universal Standard Time (i.e., the Universal Time Coordinate) that can be obtained from the standard wave or by the GPS.

More specifically, the standard wave JJY and the standard wave JG2A, both controlled and transmitted by Frequency Standard Section, Standard Time Measuring Department, the Ministry of Post and Telecommunication, indicate the Japan Standard Time (JST) based on the Universal Time Coordinate (UTC). The standard wave JJY is accurate to about 1 ms or less. Using such a standard wave, the time data can recorded with high precision. Various standard waves are available outside Japan. (For example, the wave BPM is can be used in China, the wave WWVH in the United States, the wave RID in Russia, the wave BSF in Taiwan, the wave HLA in Korea, and the like). Needless to say, any one of these standard waves may be used in the place where it can be better received than any other standard wave.

Among the commercially available time-measuring devices utilizing the GPS are the above-mentioned Jupiter, manufactured by Kabushiki Kaisha SPA, and Time transfer GPS Receiver and Time Transfer GPS Receiver GT-74, both designed to achieve synchronization and both manufactured also by Kabushiki Kaisha SPA.

It is desired that the time data items be recorded for all pictures taken by the camera device, each in association with one picture, in the same way as the position data items. That is, if the camera device continuously takes pictures, one after another, the data item representing the time of taking a picture, or fame, should better be recorded.

If the amount of data that can be recorded within a unit time is limited, however, the time-data recording means may record only the time data items for some of the pictures taken by the camera device, each data item in association with one picture. For example, the time data is recorded for every other two or more frames (pictures). Alternatively, the time-data recording means may record only the time the camera device started taking pictures and the time the camera device finished taking pictures.

In the case where the time data items may not recorded in association of all frames, respectively, any time data item not recorded may be interpolated from the immediately preceding time data item and the immediately following time data item, in the course of reproducing the frames. To be more specific, time data items not recorded may be interpolated in time sequence, each from the preceding and following time data items, by means of either linear interpolation or spline interpolation.

2. Detailed Description of the Embodiments

The image recording apparatuses, which are the embodiments of this invention will be described in greater detail.

As indicated above, the image recording apparatuses of the invention record position data as the camera device takes pictures of an object, one after another. The image recording apparatuses may be provided in two types. The first type comprises a conventional camera device, such as a video camera, and a position-data recording means and the like attached to the camera device. The second type comprises a conventional camera device and a position-data recording means and the like incorporated in the camera device.

The image recording apparatuses of the first type will be described in detail, with reference to specific embodiments. So will be the image recording apparatuses of the second type. In either type, the sensor section that acquires position data is formed integral with the camera device, thereby to detect any motion the camera device undergoes.

The data recording apparatus of the invention may record video signals, audio signals, position, time data, and the like on two types of recording media, as will be described below. The first medium is a magnetic tape, and the second medium is a photomagnetic disk. Nonetheless, the recording medium is not limited to these. Rather, any other kind of recording medium can be used in the invention so long as a large amount of data, such as images, can be recorded on it. More particularly, recording media used in external memories, such as a magnetic tape, a magnetic disk, photomagnetic disk, a phase-change photomagnetic disk, and the like, may be used in the image recording apparatus. Further, so-called solid-state memories, such as semiconductor memories (a RAM, a flash memory, a ferroelectric RAM, and the like) can be used in the image recording apparatus.

2-1 Image Recording Apparatus with External Means

The image recording apparatus according to the invention, which comprises a conventional camera device, such as a video camera, and a position-data recording means and the like, may be provided in two types. The conventional camera device may be either a combination of a video recorder and a camera incorporated in the video recorder, or a combination of a video recorder and a camera connected to the video recorder. Embodiments of the invention, each having a camera-incorporating video recorder, and embodiments, each having a camera-connected video recorder, will be described below.

2-1-1 Apparatus with a Camera-Incorporating Video Recorder

An image recording apparatus, which is a combination of a conventional camera device, such as a video camera, and a position-data recording means and the like attached to the camera device which is a camera-incorporating video recorder, will be described first.

In the conventional camera-incorporating video recorder, the external input is usually an audio input only. In the present embodiment, the position data generated by sensors is converted to an audio signal, and the audio signal thus generated is input to the camera-incorporating video recorder. The audio signal is thereby recorded at the same time a video signal is recorded.

2-1-1-1 First Configuration

Figure 2:
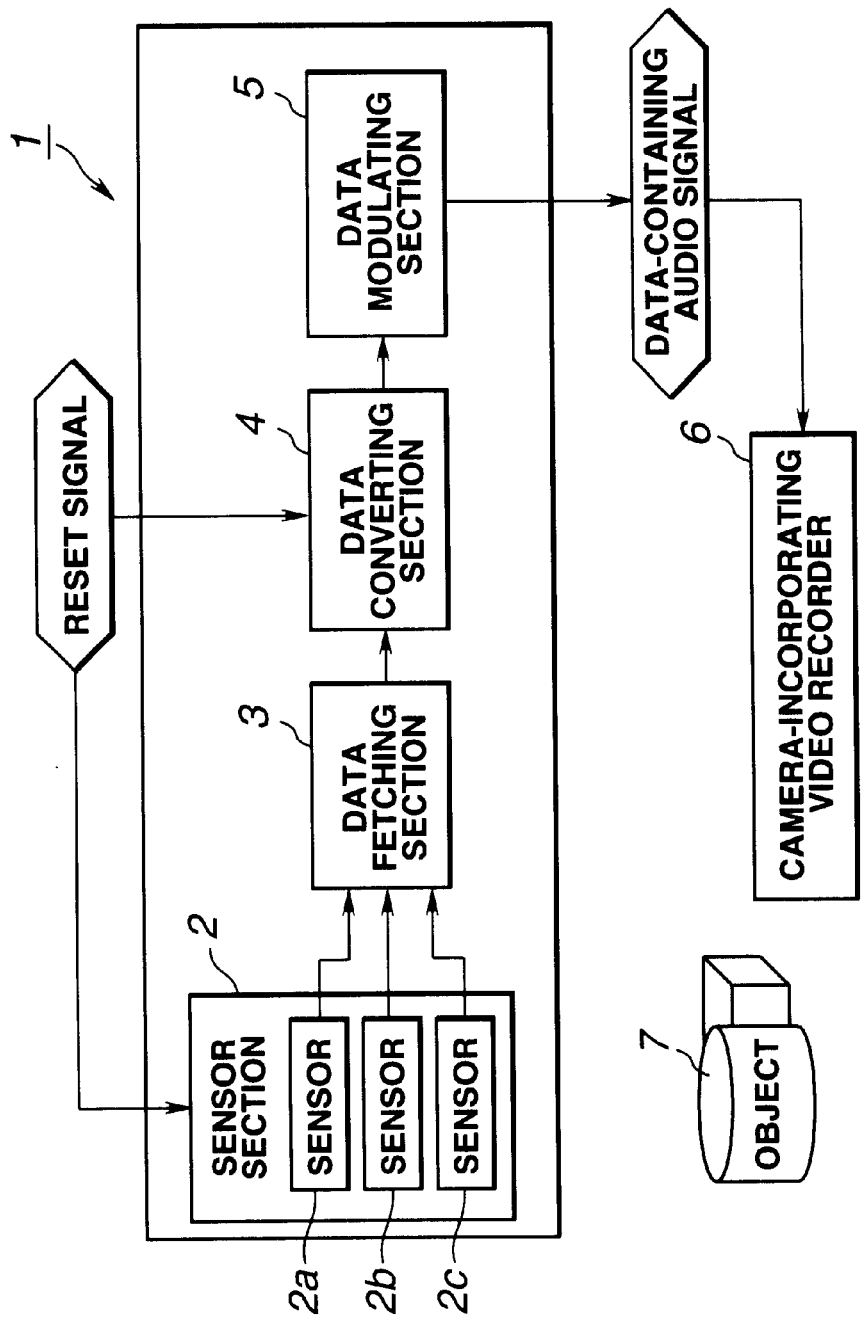
FIG. 2 is a block diagram of an image recording apparatus according to the present invention.

FIG. 2 shows the first configuration of an image recording apparatus having a camera-incorporating video recorder 6. This image recording apparatus 1 comprises a sensor section 2. The sensor section 2 has a plurality of sensors 2a, 2b and 2c, which are designed to detect the translational motion or rotational motion of a camera-incorporating video recorder 6. The signals output from the sensors 2a, 2b and 2c are converted to digital detection data by means of analog-to-digital conversion. The digital detection data is supplied via a data fetching section 3 to a data converting section 4.

The data converting section 4 converts the detection data, which represents a motion of the video recorder 6, which is relative to an object 7, to data representing an absolute motion of the video recorder 6. The section 4 also performs an operation on the data items output from the sensors 2a, 2b and 2c and compare these data items. Further, the section 4 converts the position data showing the translational or rotational motion of the video camera 6 to a data packet for each unit time, multiplexed in a prescribed format. To convert the detection data representing the relative motion of the video recorder 6, to the data representing the absolute motion thereof, a position reset signal may be externally and manually input in order to provide a reference point.

The data packet generated by the data converting section 4 and output therefrom is supplied to a data modulating section 5. The data modulating section 5 converts the data packet to a signal of audio-frequency band. This conversion of data is accomplished by modulating the carrier waves (amplitude modulation, frequency modulation, phase modulation, amplitude-phase modulation, or spectrum-diffusion modulation). To achieve this data conversion, modem techniques defined by CCITT Series V recommendations can be employed. These modem techniques are classified into two types, data-compression and non-data-compression. A modem having the data-compression function may not process data at a constant speed.

The audio signal output from the data modulating section 5, which contains the position data, is input to the audio input terminal of the camera-incorporating video recorder 6. The position data is thereby recorded in the form of an audio data, at the same time the video data generated by the video recorder 6 records the video data as the camera incorporated in the video recorder 6 takes pictures of an object 7.

2-1-1-2 Second Configuration

Figure 3:
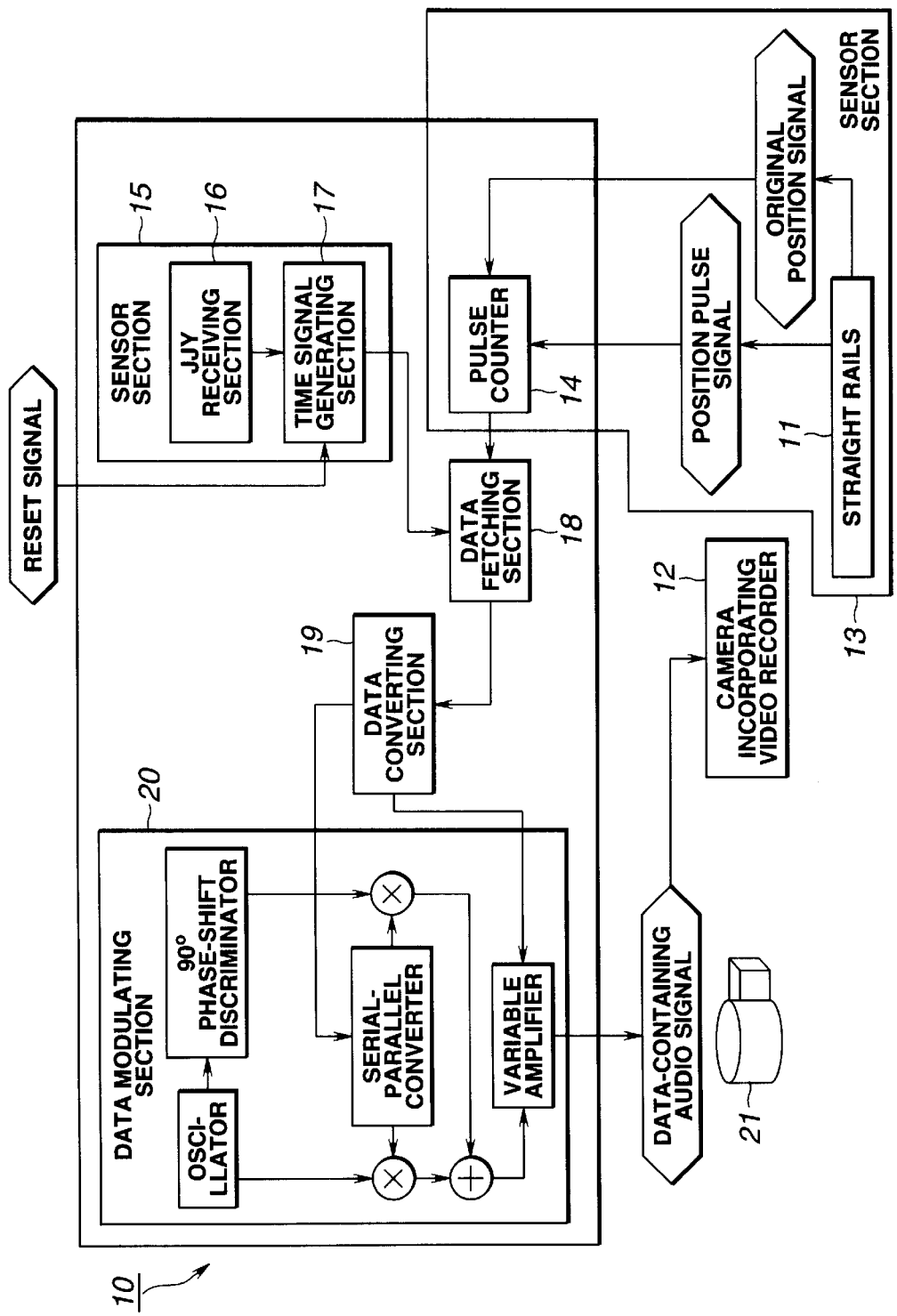
FIG. 3 is a block diagram of an image recording apparatus of another type according to the invention.

FIG. 3 shows the second configuration of an image recording apparatus that has a camera-incorporating video recorder 12, too. In this image recording apparatus 10, position data and time data are input to the camera-incorporating video recorder 12 which is moving on a straight rail 11. The position data represents the distance of the video recorder 12 from the reference point on the rail 11. The time data is the Japan Standard Time calibrated by the standard wave JJY.

The image recording apparatus 10 comprises a first sensor section 13. The first sensor section 2 has a magnetic scale (not shown) attached to the straight rail 11. The magnetic scale detects the position of the camera-incorporated video recorder 12 that is moving on the straight rail 11. The magnetic scale outputs a reference point signal and a position pulse signal. The position pulse signal consists of two signals that differ in phase. From the phase difference between the two signals, the direction and distance the video recorder 12 has moved from the reference point on the rail 11. A pulse counter 14 receives the reference point signal as a reset signal. Upon receipt of the reference point signal, the pulse counter 14 starts counting the pulses of the position pulse signal, increasing or decreasing its count in accordance with the direction in which the video recorder 12 is moving. The pulse counter 14 therefore finds the absolute distance from the reference point, in units of the minimum distance that the magnetic scale can detect. The pulse counter 14 generates digital data showing the absolute distance. The minimum distance that the magnetic scale can detect may be 10 $\mu$m, the distance data is given in units of microns, and the digital data consists of 28 bits. If so, the distance data can represent a distance of about 268 m, in units of microns.

The image recording apparatus 10 has a second sensor section 15. The second sensor section 15 comprises a JJY receiving section 16 for receiving the standard wave JJY, and a time-signal generating section 17 for generating a time signal.

The JJY receiving section 16 receives the standard wave JJY and calibrates time in accordance with the time signals, such as the second signal and the minute signal both represented by the wave JJY. The section 16 generates a time signal showing the time thus calibrated, which is supplied to the time-signal generating section 17. The section 17 compares the time signal with a time signal generated by an internal oscillator (e.g., quartz oscillator), thus generating a signal that represents time in units of, for example, $\frac{1}{2400}$ second and accumulates these units of time from the zero hour of everyday. The section 17 then generates time data which represents the signal time units, thus accumulated, and which consists of 28 bits. Further, the time-signal generating section 17 accumulates the days from, for example, Jan. 1, 1900, and generates 18-bit date data representing the number of days accumulated. A reset signal may be manually input to the time-signal generating circuit 17, thereby to reset the time data representing the year, month, day and hour.

The unit of the time data, unit of date data, point of starting accumulating days, number of bits forming the data, and the like are not limited to the values exemplified above. In the instance indicated above, 46-bit data can represent the time up to, as the most distant future, Sep. 21, 2617, in units of 1/2400 second.

The distance data output from the first sensor section 13 and the time data output from the second sensor section 15 are input to a data fetching section 18, either sequentially or simultaneously. The data fetching section 18 holds these data items, and transfers them to a data converting section 19 in response to a request made by the data converting section 19. The data converting section 19 converts the data items to a data packet of a prescribed format. More specifically, the section 19 combines the 18-bit date data, the 28-bit time data, the 28-bit distance data, and a 4-bit preamble (service bits) thus generating 78-bit data. The 78-bit data is output to a data modulating section 20, at intervals of 30 Hz.

Figure 4:
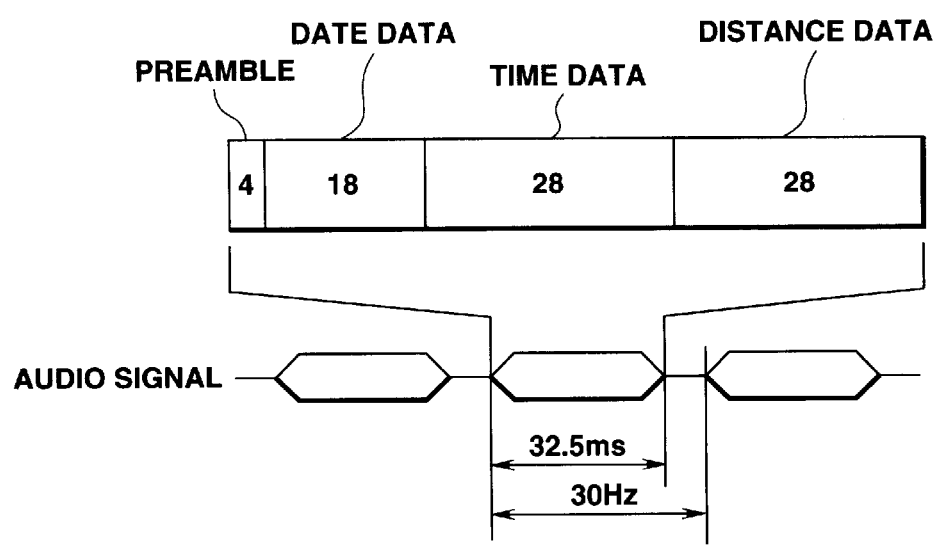
FIG. 4 shows the data format of a data packet containing time data and distance data, illustrating the relation between the data packet and an audio signal.

The data modulating section 20 receives a data packet from the data converting section 19 and converts the same to an audio signal. For example, the section 20 effects 4-value phase modulation on every two bits of the data packet output from the data converting section 19, with carrier frequency of 1800 Hz and at a modulation rate of 1200 baud. In the present embodiment, the modulation is conducted at the rate of 2400 bps (bits per second), which corresponds to CCITT V.26 or V.26bis. In this embodiment, audio-signal interruption period are set in accordance with the signal from the data converting section 19. The audio-signal interruption periods, each equivalent to two bits in a data packet, separate data packets, one from another, as is illustrated in FIG. 4.

The distance data, time data and date data are supplied, in the form of an audio signal, to the audio input of the camera-incorporated video recorder 12. The audio signal is recorded, together with image data. That is, the audio signal, which contains the position data and time data output from data modulating section 20, is supplied to the audio input of the video recorder 12 when the camera takes pictures of an object 21. The video recorder 12 records the position data and the time data in the form of speech, along with the image data.

2 Apparatus with a Camera-Connected Video Recorder

An image recording apparatus, which is a combination of a conventional camera device, such as a video camera, and a position-data recording means and the like attached to the camera device which is a camera-connected video recorder, will be described below.

In this image recording apparatus, the position-data recording means and the like can be connected between the video camera and the video recorder. The audio signal or the video signal transferred between the video camera an the video recorder, or both, can contain the position data and the like.

In the apparatus with the camera-connected video recorder, the position data and the like, which have been generated, are converted to an audio signal, which may be recorded simultaneously with the video signal. Alternatively, the position data and the like may be converted to a signal that can be superposed on the video signal and may then be recorded along with the video signal. Still alternatively, the position data and the like may be converted to an audio signal and also to a signal that can be superposed on the video signal and the two signals thus obtained may be recorded together with the video signal.

If the position data and the like are converted to an audio signal and the audio signal, thus generated, is recorded in the video recorder, however, the audio signal generated by a microphone may not be recorded at all or may deteriorate in quality, if it is recorded. In view of this problem, it is not so desirable to record the position data and the like in the form of an audio signal. On the other hand, the video signal has a broad data band (namely, contains a great amount of data), and various data can be superposed on it by means of the multiplexing technique. It is therefore desired that the position data and the like be superposed on the video signal.

Video signals, such as NTSC signal, SECAM signal, and HDTV signal, contain data representing scanning lines that are usually not displayed on the screen. The scanning period during which these scanning lines are not displayed is known as ertical blanking interval (VBI). The position data and the like may be superposed on the video signal during the vertical blanking interval. In this case, the video signal does not deteriorate at all.

This system (VBI system), in which data is superposed on the video signal during the vertical blanking interval, is used in surface-wave teletext broadcasting and surface-wave data broadcasting. There are two types of surface-wave data broadcasting practiced in Japan. They are Bitcase system and ADAMS system. In Japan, the surface-wave broadcasting is based on the NTSC system. In the NTSC system, 21 scanning lines of the 525 scanning lines available are left unused in the ordinary television broadcasting. Thus, four of these 21 scanning lines are used in the teletext broadcasting and the data broadcasting. In the surface-wave data broadcasting, whether Bitcast system or ADAMS system, synchronization bits and error-correction bits, totaling 296 bits, and data bits, totaling 176 bits, can be transmitted during a one-scanning line period. That is, data can be transmitted at the rate of about 10 kbps.

Figure 5:
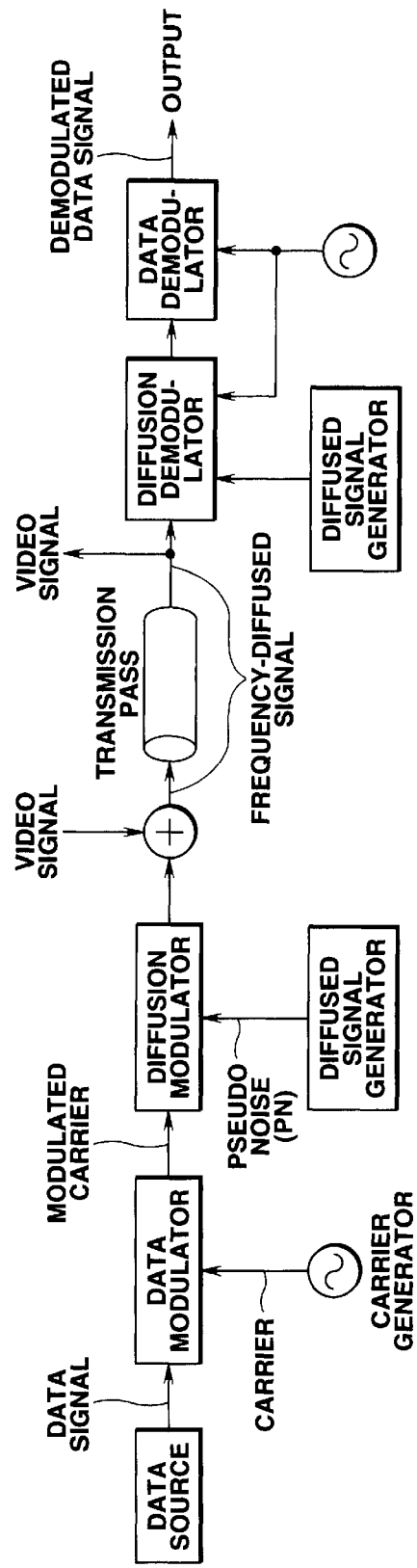
FIG. 5 is a diagram for explaining the principle of frequency-diffusion communication technique.

The position data may be recorded by utilizing the frequency-diffusing technique, such as electronic watermark technique. The electronic watermark technique are available in various types. In one electronic watermark technique, pixels are substituted for one another. In another watermark technique, pixel spaces are used. In still another watermark technique, quantization errors are used. In a further watermark technique, frequency regions are utilized. The principle of the frequency-diffusion communication, which is one of the electronic watermark techniques, will be explained with reference to FIG. 5. Various frequency-diffusion communication systems are available, such as direct-diffusion modulation, frequency-hopping modulation, pulse frequency modulation, and chirp modulation. FIG. 5 shows a direct-diffusion modulation system. In the direct-diffusion modulation system, the carrier waves modulated with a data signal are subjected to diffusion modulation, by using a train of digital codes called pseudo noise having a bit rate higher than the bandwidth of the data signal. The data signal therefore acquires a band much broader than is possible in the ordinary modulation system. The data signal, thus modulated, is therefore regarded as nothing more than noise, as compared with data signals modulated by ordinary modulation system.

The signal transmitted through a transmission path is subjected to diffusion demodulation and the data demodulation, thereby converted to a data signal. The diffusion signal generator provided in the receiving station can demodulate the signal by using the same train of digital codes as used in the transmitting station. In the case where the signal is used as an electronic watermark, the signal subjected to frequency diffusion and the video signal are mixed at a specific ratio that depends on the quality of the image to be recorded. In this system, the data signal is superposed on the entire video signal. Hence, the video signal may more likely deteriorate than in the VBI system.

2-1-2-1 First Configuration

Figure 6:
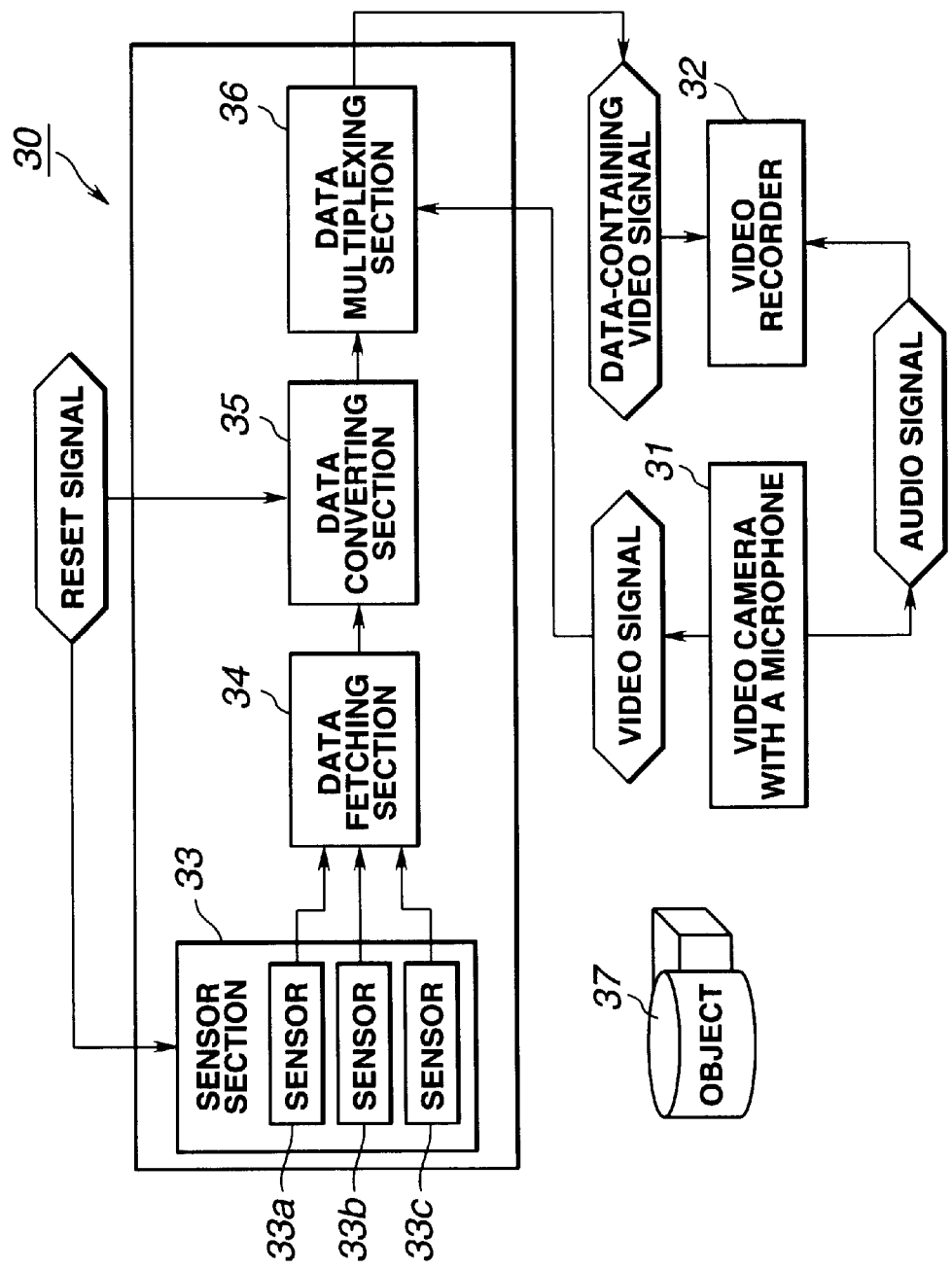
FIG. 6 is a block diagram showing another image recording apparatus according to this invention.

FIG. 6 shows the first configuration of an image recording apparatus having a camera-connected video recorder and designed to superpose position data on a video signal. This image recording apparatus 30 comprises a video camera 31 and a video recorder 32. The video camera 31 has a microphone. The video recorder 32 records the video data generated by the video camera 31 and audio data generated by the microphone.

As shown in FIG. 6, the image recording apparatus 30 further comprises a sensor section 33 for detecting the translational or rotational motion of the video camera 31. The sensor section 33 has a plurality of sensors 33a, 33b and 33c. These sensors are designed to detect the translational motion or rotational motion of the video camera 31. The signals output from the sensors 33a, 33 and 33c are converted to digital detection data by means of analog-to-digital conversion. The digital detection data is supplied via a data fetching section 34 to a data converting section 35.

The data converting section 35 converts the detection data generated by the sensor section 33, which represents a motion of the video camera 31, which is relative to an object 37, to data representing an absolute motion of the video camera 31. The section 35 also performs an operation on the data items output from the sensors 33a, 33b and 33c and compare these data items. Further, the section 35 converts the position data showing the translational or rotational motion of the video camera 31 to a data packet for each unit time, multiplexed in a prescribed format. To convert the detection data representing the relative motion of the video camera 31, to the data representing the absolute motion thereof, a position reset signal may be externally and manually input in order to provide a reference point.

The data packet generated by the data converting section 35 and output therefrom is supplied to a data multiplexing section 36. The data multiplexing section 36 converts the data packet to a signal than can be superposed on a video signal. The section 36 then superposes the signal on a video signal supplied from the video camera 31.

The video signal superposed with the position data is input to the video recorder 32. In the image recording apparatus 30, the video camera 31 takes pictures of the object 37, generating image data, and the video recorder 32 superposes the position data on the image data. The position data is thereby recorded, together with the image data. In this apparatus 30, the audio signal output from the video camera 31 is supplied to the video recorder 32, without being processed, and is recorded by the video recorder 32.

2-1-2-2 Second Configuration

Figure 7:
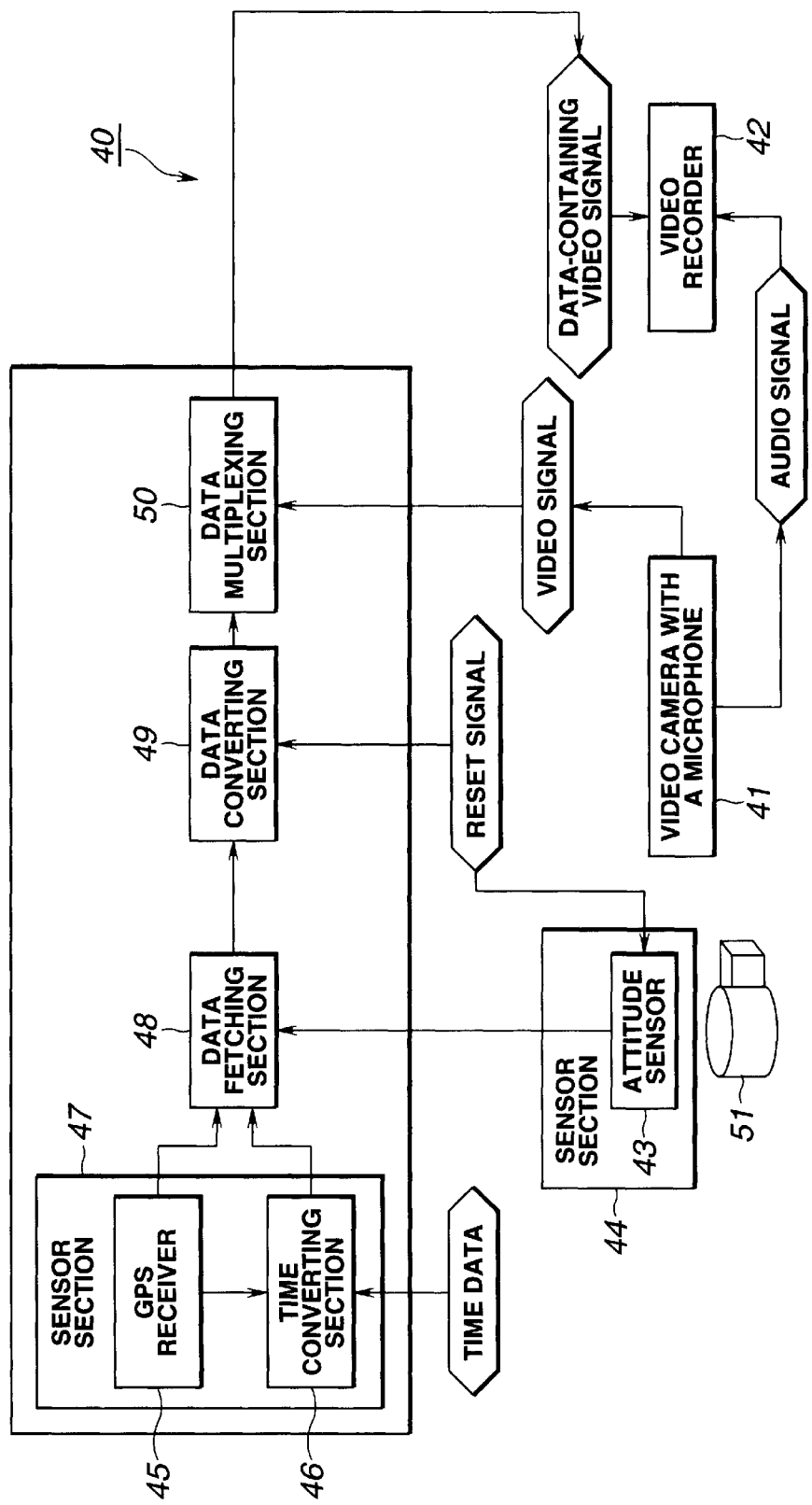
FIG. 7 is a block diagram depicting still another image recording apparatus according to the invention.

FIG. 7 shows the second configuration of an image recording apparatus that has a camera-connected video recorder, too. This image recording apparatus 40 is designed to superpose position data and time data on a video signal. As shown in FIG. 7, the apparatus 40 comprises a video camera 41 and a video recorder 42. The video camera 41 has a microphone. The video recorder 42 records the video data generated by the video camera 41 and audio data generated by the microphone.

The image recording apparatus 40 comprises a fist sensor section 44 and a second sensor section 47. The first sensor section 44 has an attitude sensor 43. The second sensor section 47 has a GPS receiver 45 and a time converting section 46. The sensor sections 44 and 47 detect the motion of the video camera 41 which is freely moving and also detect the time when the video camera 41 takes pictures of an object 51. The sensor sections 44 and 47 generate position data and time data, which are supplied to the video recorder 42. The video recorder 42 records the position data and time data on a recording medium.

The attitude sensor 43 incorporates three vibratory gyroscopes and three acceleration sensors, which cooperate to detect a distance and direction with respect to a predetermined reference point. The attitude sensor 43 generates position data that represents both the distance and the direction. The position data will be recorded by the video recorder 42. The video recorder 42 records position data of a different scale, obtained by the GPS and representing the latitude, longitude and altitude. Also, the video recorder 42 records the data representing the Universal Time Coordinate calibrated by the GPS.

The attitude sensor 43, which has three vibratory gyroscopes and three acceleration sensors, outputs data that represents the inclination angle, bearing angle (roll, pitch, and yaw) and acceleration. The GPS receiver 45 receives waves of a 1575.42 MHz (L1)C/A code from the GPS satellites and also the D-GPS signal (Differential-GPS) signal (e.g., error-correction data RTCM-SC104 transmitted through FM-teletext broadcasting by Kabushiki Kaisha Satellite Measuring Information Center). The GPS receiver 45 outputs latitude-longitude-altitude data that is accurate to a few meters, in the form of digital data of, for example, the NMEA-0183 format.

The GPS receiver 45 receives waves from the GPS satellites and generates, as time data, a 1 Hz pulse signal that is synchronized with the UTC (Universal Time Coordinate) at the leading edge. The time converting section 46 receives the time data manually or automatically input to the second sensor section 47 and the pulse signal output from the GPS receiver 45. The time data represents the year, month, day, hour, minute and second. The section 46 compares the time data with the time measured by the internal clock and generates date data and time data, both being synchronous with the UTC.

The image recording apparatus 40 comprises a data fetching section 48, a data converting section 49, and a data multiplexing section 50. The data fetching section 48 fetches the position data from the attitude sensor 43, the position data from the GPS receiver 45, and the time data and date data from the time converting section 46, either sequentially or simultaneously. If necessary, the data fetching section 48 holds these items of data. In response to a request made by the data converting section 49, the data fetching section 48 supplies these items of data to the data converting section 49.

The data converting section 49 integrates the acceleration data supplied from the attitude sensor 43, thereby generating data representing the distance from the reference point represented by a position reset signal. The position reset signal is input to the data converting section 49, either manually or automatically. To be more specific, every time the video camera 41 starts taking a picture of the object 51, the reset signal is input to the attitude sensor 43 or the data converting section 49, and the position where the camera 41 starts taking the picture is used as a point of origin for the translational or rotational motion of the video camera 41.

The data converting section 49 converts the time data, time data and date time to a data packet of a specific format.

For example, the section 49 converts the time data representing Jan. 1, 1998, 23:45:00.678, the position data representing north latitude 35°37 3.000 east longitude 139(44 9.000 and the position data representing translation X-axis of 4,000,000,000 (m, Y-axis of 4,000,000,000 (m, Z-axis of 4,000,000,000 (m, rotation-roll of +23(45 4.00 rotation-pitch of −23(45 4.00 and rotation-yaw of +23(45 4.00 to a 95-byte ASCII data of 9980101 23450678 N35371300 E139440900 4000000000 4000000000 4000000000 +23452400 345400 +2345400 that consists digits 0 to 9, signs + and −, and letters N, S, E and W only. The section 49 then converts the 95-byte data to 380-bit data, by the use of 4-bit data items that represent digits 0 to 9, signs +and −, and letters N, S, E and W. The data packet, thus generated, is supplied from the data converting section 49 to the data multiplexing section 50.

The data multiplexing section 50 receives the data packet from the data converting section 49 and converts the packet to a signal that can be superposed on a video signal. The section 50 then superposes the signal on the video signal output from the video camera 41.

The video signal, on which the position data and time data (i.e., the position data, time data and date data) is superposed, is input to the video recorder 42, which records the video signal. That is, in the image recording apparatus 40, the video camera 41 takes pictures of the object 51, generating a video signal. Before the video recorder 42 records the video signal on the recording medium, the data and time data are superposed on the video signal. Hence, the position data and the time data are recorded, along with the image data. In the image recording apparatus 40, the audio signal generated by the microphone incorporated in the video camera 41 is supplied to the video recorder 42, without being processed, and is recorded on the recording medium.

2-2 Image Recording Apparatus Incorporating Means

An image recording apparatus according to the invention, which comprises a conventional camera device, and a position-data recording means and the like which are incorporated in the camera device, will now be described. This apparatus can record the position data and the like generated by sensors, together with image data, too.

In this image recording apparatus, position data and the like can be recorded in an audio signal or a video signal in the same way as in any image recording apparatus described above, in which the position-data recording means and the like are provided outside the camera device. The section for recording the position data and the like may be incorporated at any position in the apparatus. It does not matter whether this section is a camera-incorporating video recorder or a camera-connected video recorder. Two types of image recording apparatuses will be described below, each having a camera device that incorporates the position-data recording means and the like. The first type comprises an analog video recorder, and the second type comprises a digital video recorder.

2-2-1 Apparatus with a Analog Video Recorder

Various configurations of an image recording apparatus comprising an analog video recorder, which can records position data and the like, along with image data, will be described first.

1-1-0-1 First Configuration

Figure 8:
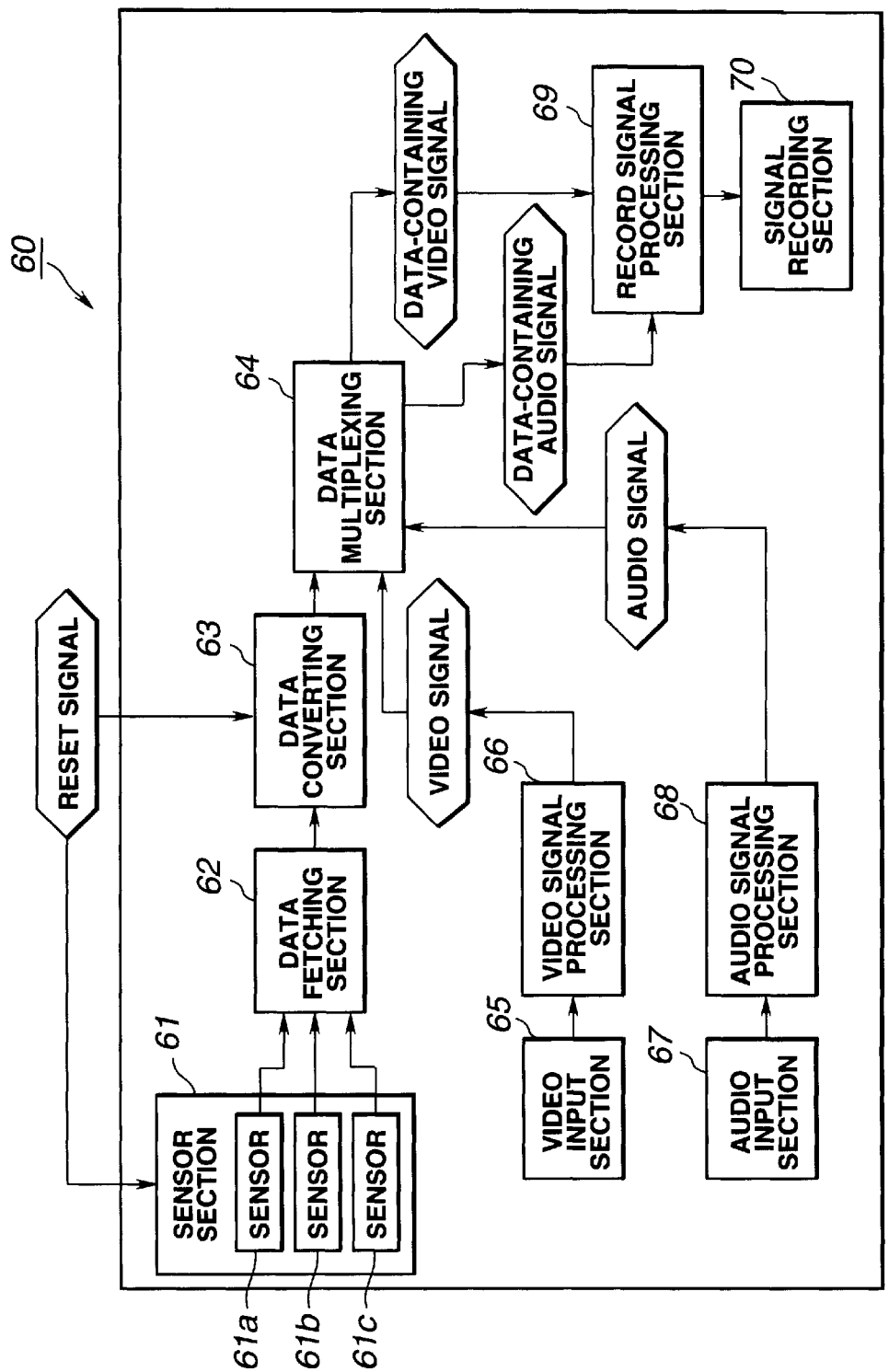
FIG. 8 is a block diagram illustrating a further image recording apparatus according to the present invention.

FIG. 8 illustrates the first configuration of an image recording apparatus that comprises an analog video recorder (not shown). This apparatus 60 can superpose position data on both an audio signal and a video signal, thus recording the position data, along with the audio and video signals.

The image recording apparatus 60 comprises a sensor section 61 for detecting the translational or rotational motion of the analog video camera. The sensor section 61 incorporates a plurality of sensors 61a, 61b and 61c for detecting the translational or rotational motion of the video camera. The detection signals output from the sensors 61a, 61b and 61c are converted to digital detection data by means of analog-to-digital conversion. The digital detection data is supplied via a data fetching section 62 to a data converting section 63.

The data converting section 63 converts the detection data generated by the sensor section 61, which represents a motion of the video camera, which is relative to an object (not shown), to data representing an absolute motion of the video camera. The section 63 also performs an operation on the data items output from the sensors 61a, 61b and 61c and compare these data items. Further, the section 63 converts the position data showing the translational or rotational motion of the video camera to a data packet for each unit time, multiplexed in a prescribed format. To convert the detection data representing the relative motion of the video camera, to the data representing the absolute motion thereof, a position reset signal may be externally and manually input in order then to provide a reference point.

The data packet generated by the data converting section 63 and output therefrom is supplied to a data multiplexing section 64. The data multiplexing section 64 converts the data packet to a signal than can be superposed on a video signal and an audio signal. The section 64 then superposes the signal on the video signal supplied from a video input section 65 through a video signal processing section 66, thus generating a video signal containing the position data. The section 64 superposes the same signal on the audio signal supplied from an audio input section 67 through an audio signal processing section 68, thereby generating an audio signal containing the position data.

The data-containing video signal and the data-containing audio signal output are supplied from the data multiplexing section 64 to a record signal processing section 69. The record signal processing section 69 processes the video signal and the audio signal, generating signals that can be recorded on a recording medium. The signals output from the section 69 are supplied to a signal recording section 70. The signal recording section 70 records the input signals on the recording medium, such as magnetic tape, by means of analog recording.

1-1-0-2 Second Configuration

Figure 9:
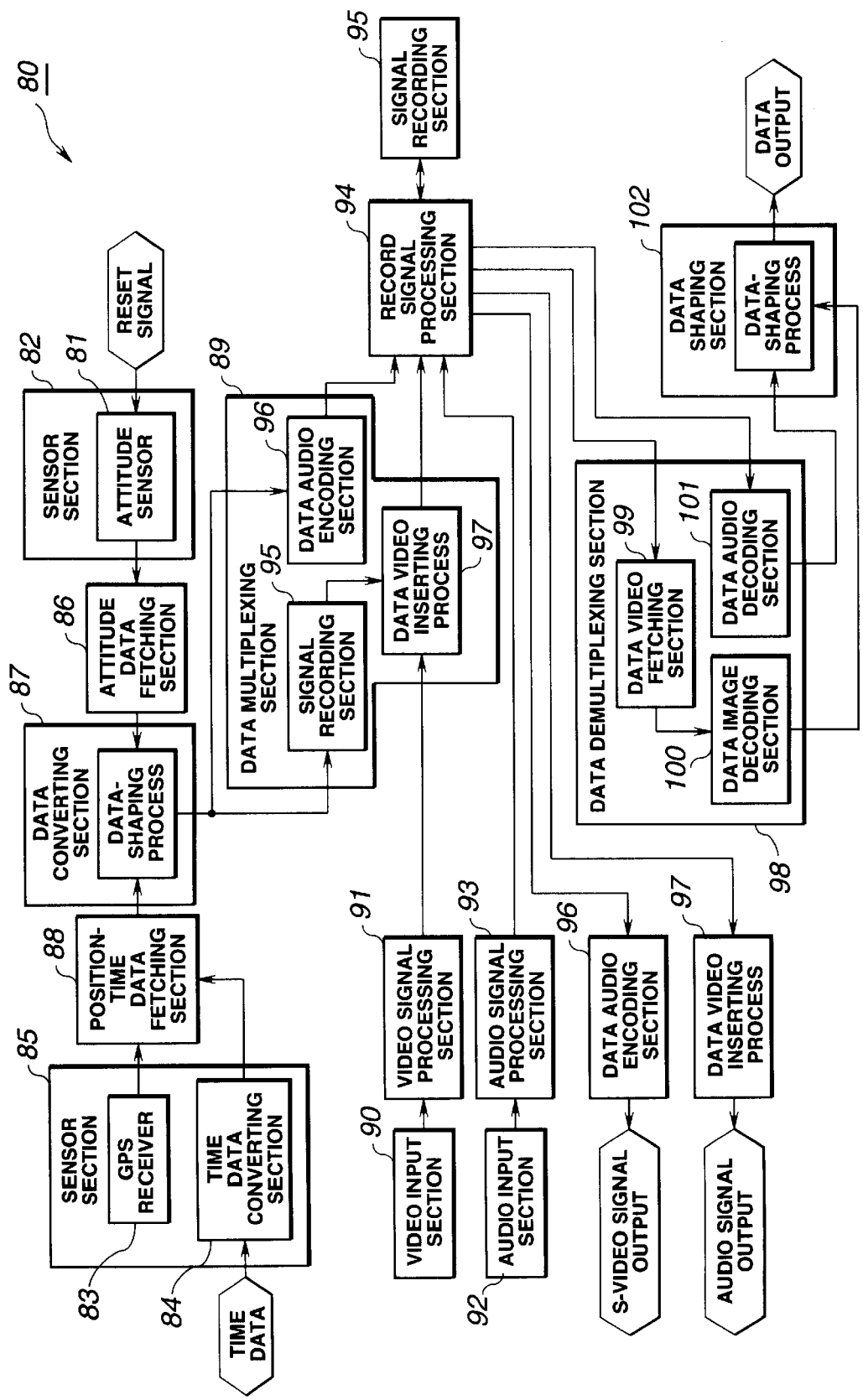
FIG. 9 is a block diagram showing an image recording apparatus according to this invention.

FIG. 9 illustrates the second configuration of an image recording apparatus which comprises an analog video recorder (not shown) of high-band, 8-mm (Hi8) system. This analog video recorder uses magnetic tape as recording medium. The image recording apparatus 80 can superpose position data on both an audio signal and a video signal, thus recording the position data, along with the audio and video signals.

A high-band, 8-mm video recorder has an AFM input, a PCM input, an AFM output and a PCM output. In other words, this video recorder can receive two different signals and can output two different signals. Therefore, in the image recording apparatus 80, an ordinary audio signal is recorded by means of PCM speech recording, and position data and time data are recorded by mans of AFM speech recording. The position data and time data are recorded into a video signal by using the VBI system described above.

The image recording apparatus 80 comprises a first sensor section 82 and a second sensor section 85. The first sensor section 82 incorporates an attitude sensor 81. The second sensor section 85 incorporates a GPS receiver 83 and a time data converting section 84. The sensor sections 82 and 85 detect the motion of the video camera that is freely moving and also detect the time when the video camera takes pictures of an object (not shown). The sensor sections 82 and 85 generate position data and time data, which will be recorded on the recording medium.

The attitude sensor 81 incorporates three vibratory gyroscopes and three acceleration sensors, which cooperate to detect a distance and direction with respect to a predetermined reference point. The attitude sensor 81 generates position data that represents both the distance and the direction. The position data will be recorded. Position data of a different scale, obtained by the GPS and representing the latitude, longitude and altitude, will be recorded, too. Further, time data representing the Universal Time Coordinate calibrated by the GPS, will be recorded.

The attitude sensor 81, which has three vibratory gyroscopes and three acceleration sensors, outputs digital data that represents the inclination angle, bearing angle (roll, pitch, and yaw) and acceleration. If necessary, a reset signal representing a reference point is manually input to the attitude sensor 81.

The image recording apparatus 80 comprises a GPS receiver 83 for generating position data of a different scale. The GPS receiver 83 receives waves of a 1575.42 MHz (L1)C/A code from the GPS satellites and also receives the D-GPS signal (Differential-GPS) signal (e.g., error-correction data RTCM-SC104 transmitted through FM-teletext broadcasting by Kabushiki Kaisha Satellite Measuring Information Center). The GPS receiver 83 outputs latitude-longitude-altitude data that is accurate to a few meters, in the form of digital data of, for example, the NMEA-0183 format.

The GPS receiver 83 receives waves from the GPS satellites and generates, as time data, a 1 Hz pulse signal that is synchronized with the UTC (Universal Time Coordinate) at the leading edge. This pulse signal is input to a data converting section 84. The data converting section 84 also receives the time data manually or automatically input, i.e., the year, month, day, hour, minute and second. The section 84 compares the time data with the time measured by the internal clock and generates date data and time data, both being synchronous with the UTC.

The output from the attitude sensor 81 is supplied to a data converting section 87 via an attitude data fetching section 86. The outputs from the GPS receiver 83 and time data converting section 84 are input to the data converting section 87 via a position-time data fetching section 88. The data converting section 87 performs a prescribed data-shaping process on the input data. The data, thus processed, is transferred to a data multiplexing section 89.

The data multiplexing section 89 receives the data from the data converting section 87 and converts the same to a signal that can be superposed on a video signal and an audio signal. The signal is superposed on the video signal input from a video input section 90 via a video signal processing section 91. The signal is also on the audio signal input from an audio input section 92 via an audio signal processing section 93. The video signal and the audio signal, both superposed with the signal, are supplied to a record signal processing section 94.

The data multiplexing section 89 comprises a data video encoding section 95, a data audio encoding section 96, and a data audio inserting section 97. The data video encoding section 95 converts that part of the data supplied from the data converting section 87, which is to be superposed on the video signal, to a signal that can be superposed on the video signal. This signal is supplied to the data audio inserting section 97. In the data audio inserting section 97, the signal is superposed on the video signal by the VBI system described above. Meanwhile, the data audio encoding section 96 converts that part of the data supplied from the data converting section 87, which is to be superposed on the audio signal, to a signal that can be superposed on the audio signal. This signal is superposed on the audio signal input from the audio input section 92 via the audio signal processing section 93.

The video signal and the audio signal, each superposed with the position data and the time data, are supplied to record signal processing section 94. The signal processing section 94 process the video signal and audio signal, generating signals that can be recorded on the recording medium. These signals are input to a signal recording section 95. The signal recording section 95 records the signals on the recording medium (magnetic tape) by analog recording.

In the image recording apparatus 80, the signal recording section 95 can reproduce signals from the recording medium. The signals reproduced by the section 95 are processed by the record signal processing section 94. Of the signals processed, the video signal is supplied to a video output signal processing section 96, and the audio signal is supplied to an audio output signal processing section 97.

The video output signal processing section 96 processes the video signal, reproducing an S-video signal. The audio output signal processing section 97 processes the audio signal, reproducing an audio signal.

The video signal and audio signal, thus reproduced, are supplied from the record signal processing section 94 to a data de-multiplexing section 98. The data de-multiplexing section 98 comprises a data video fetching section 99, a data image decoding section 100, and a data audio decoding section 101. The data video fetching section 99 fetches the data superposed on the video signal by the VBI system. The data thus fetched by the section 99 is supplied to the data image decoding section 100, which decodes the input data. Meanwhile, the data audio decoding section 101 fetches the data superposed on the audio signal and decodes the same. The data decoded by the data image decoding section 100 and the data decoded by the data audio decoding section 101 are supplied to a data shaping section 102. The data shaping section 102 effects a prescribed data-shaping process. The data thus processed by the section 102 is output from the image recording apparatus 80.

The image recording apparatus 80 has a high-band, 8-mm video recorder of conventional type. It follows that the video input section 90, audio input section 92, audio signal processing section 93, record signal processing section 94, signal recording section 95, and the like are almost identical to their counterparts of the conventional high-band, 8-mm video recorder.

Figure 10:
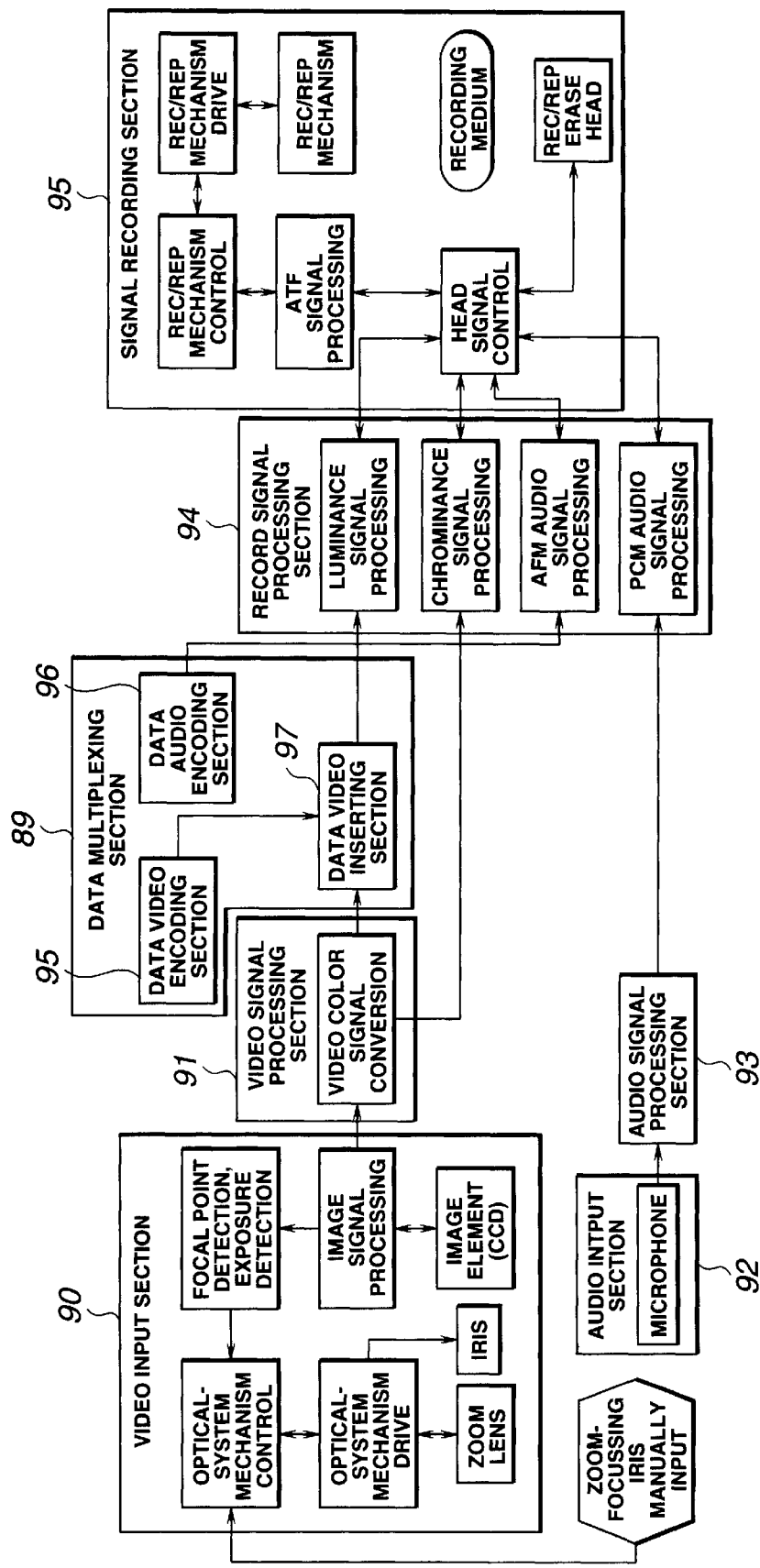
FIG. 10 is a block diagram showing, in detail, the image-recording section of the image recording apparatus shown in FIG. 9.
Figure 11:
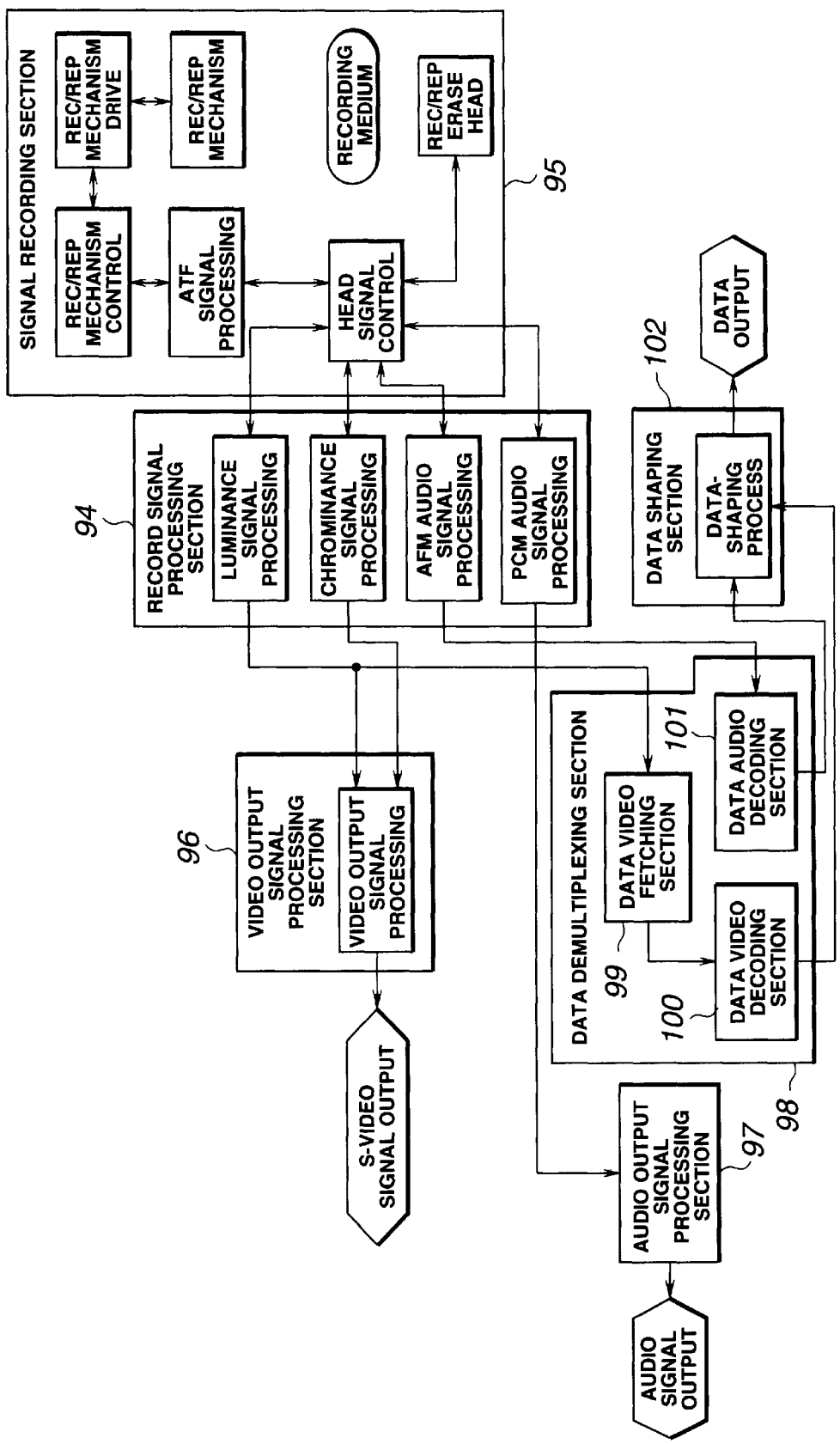
FIG. 11 is a block diagram showing, in detail, the image-reproducing section of the image recording apparatus shown in FIG. 9.

The sections that serve to record data are shown in detail in FIG. 10. They are identical to those of the conventional high-band, 8-mm video recorder, except in that the data multiplexing section 89 superposes the position data and the time data on the video signal and also on the audio signal. The sections that serve to reproduce the video signal and the audio signal are shown in detail in FIG. 11. As may be understood from FIG. 11, these sections are identical to those of the conventional high-band, 8-mm video recorder, except that the data de-multiplexing section 98 can output the position data and the time data.

2-2-2 Apparatus with a Digital Video Recorder

Various configurations of an image recording apparatus comprising an analog video recorder, which can records position data and the like, along with image data, will be described first.

2-2-2-1 First Configuration

Figure 12:
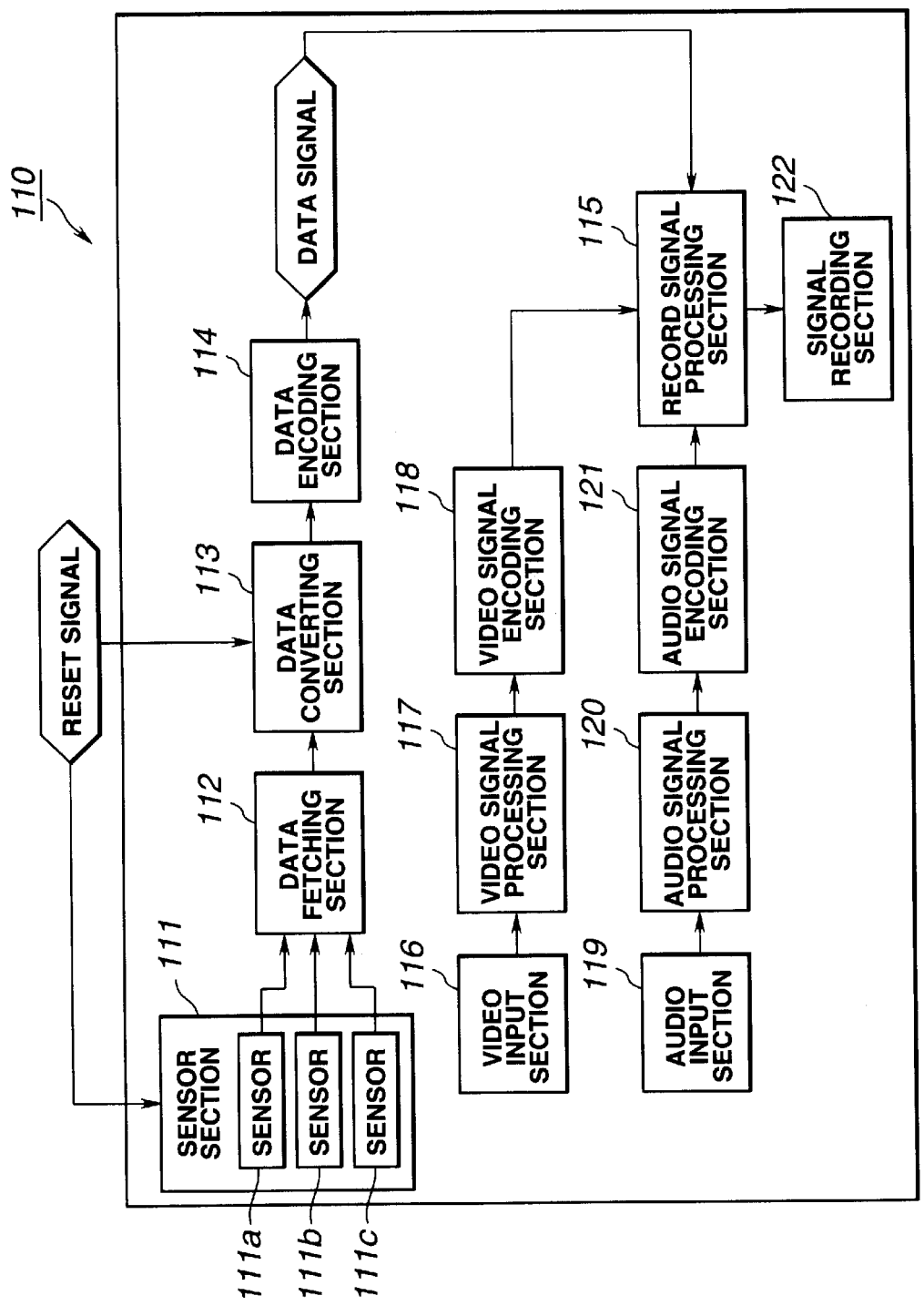
FIG. 12 is a block diagram illustrating an image recording apparatus according to this invention.

FIG. 12 illustrates the first configuration of an image recording apparatus that comprises a digital video recorder (not shown). This apparatus 110 can record position data in the added data part or video-signal part of a data packet.

The image recording apparatus 110 comprises a sensor section 111 for detecting the translational or rotational motion of the digital video camera. The sensor section 111 incorporates a plurality of sensors 111a, 111b and 111c for detecting the translational or rotational motion of the video camera. The detection signals output from the sensors 111a, 111b and 111c are converted to digital detection data by means of analog-to-digital conversion. The digital detection data is supplied via a data fetching section 112 to a data converting section 113.

The data converting section 113 converts the detection data generated by the sensor section 111, which represents a motion of the video camera, which is relative to an object (not shown), to data representing an absolute motion of the video camera. The section 113 also performs an operation on the data items output from the sensors 111a, 111b and 111c and compare these data items. Further, the section 113 converts the position data showing the translational or rotational motion of the video camera to a data packet for each unit time, multiplexed in a prescribed format. To convert the detection data obtained by the sensor section 111 and representing the relative motion of the video camera, to the data representing the absolute motion thereof, a position reset signal may be externally and manually input in order to provide a reference point.

The data packet generated by the data converting section 113 and output therefrom is supplied to a data encoding section 114. The section 114 converts the data packet to a signal that can be recorded on a recording medium. In the meantime, a video signal is supplied from a video input section 116 to a video signal processing section 117. The section 117 performs a prescribed process on the video signal, which is supplied to a video signal encoding section 118. The section 118 encodes the video signal, generating a digital signal. The digital signal is supplied to a record signal processing section 115. Similarly, an audio signal is supplied from an audio input section 119 to an audio signal processing section 120. The section 120 conducts a prescribed process on the audio signal, which is supplied to an audio signal encoding section 121. The section 121 encodes the audio signal, generating a digital signal. This digital signal is supplied to the record signal processing section 115.

The record signal processing section 115 processes the data input to it, generating a digital signal of a prescribed format, which can be recorded on the recording medium. This signal is supplied to a signal processing section 122. The signal processing section 122 records the signal, which has been supplied from the record signal processing section 115, on the recording medium by means of digital recording.

1-1-1-2 Second Configuration

Figure 13:
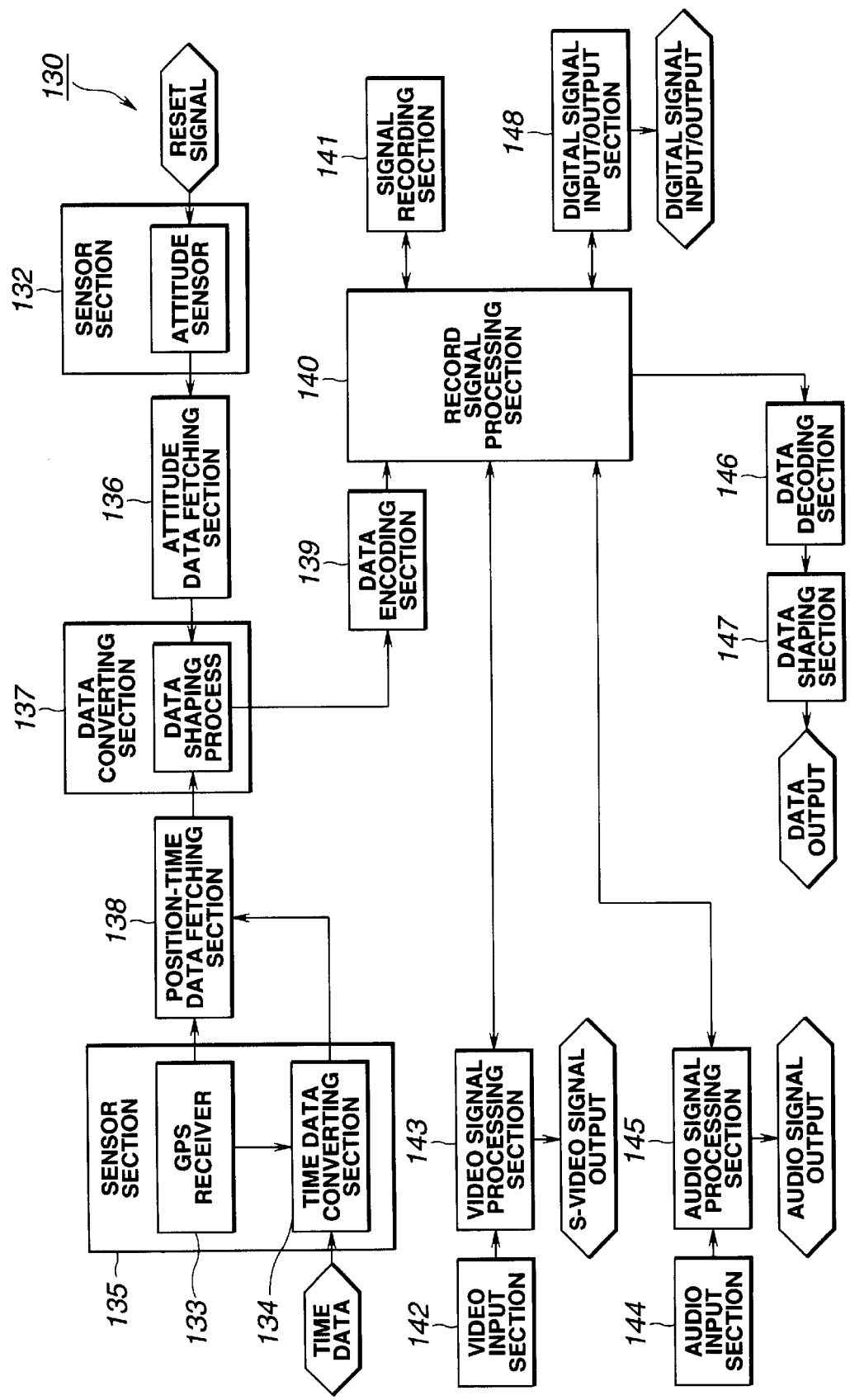
FIG. 13 is a block diagram depicting an image recording apparatus according to the present invention.

FIG. 13 illustrates the second configuration of an image recording apparatus that comprises a digital video recorder. The video recorder incorporated in this apparatus 130 is one of DV system, which uses magnetic tape as recording medium. The apparatus 130 can record position data in the added data part or video-signal part of a data packet.

The image recording apparatus 130 comprises a first sensor section 132 and a second sensor section 135. The first sensor section 132 incorporates an attitude sensor 131. The second sensor section 125 incorporates a GPS receiver 133 and a time data converting section 134. The sensor sections 132 and 135 detect the motion of the video camera that is freely moving and also detect the time when the video camera takes pictures of an object (not shown). The sensor sections 132 and 135 generate position data and time data, which will be recorded on the recording medium.

The attitude sensor 131 incorporates three vibratory gyroscopes and three acceleration sensors, which cooperate to detect a distance and direction with respect to a predetermined reference point. The attitude sensor 131 generates position data that represents both the distance and the direction. The position data will be recorded. Position data of a different scale, obtained by the GPS and representing the latitude, longitude and altitude, will be recorded, too. Further, time data representing the Universal Time Coordinate calibrated by the GPS, will be recorded.

The attitude sensor 131, which has three vibratory gyroscopes and three acceleration sensors, outputs digital data that represents the inclination angle, bearing angle (roll, pitch, and yaw) and acceleration. If necessary, a reset signal representing a reference point is manually input to the attitude sensor 131.

The image recording apparatus 130 comprises a GPS receiver 133 for generating position data of a different scale. The GPS receiver 133 receives waves of a 1575.42 MHz (L1)C/A code from the GPS satellites and also receives the D-GPS signal (Differential-GPS) signal (e.g., error-correction data RTCM-SC104 transmitted through FM-teletext broadcasting by Kabushiki Kaisha Satellite Measuring Information Center). The GPS receiver 133 outputs latitude-longitude-altitude data that is accurate to a few meters, in the form of digital data of, for example, the NMEA-0183 format.

The GPS receiver 133 receives waves from the GPS satellites and generates, as time data, a 1 Hz pulse signal that is synchronized with the UTC (Universal Time Coordinate) at the leading edge. This pulse signal is input to a data converting section 134. The data converting section 134 also receives the time data manually or automatically input, i.e., the year, month, day, hour, minute and second. The section 134 compares the time data with the time measured by the internal clock and generates date data and time data, both being synchronous with the UTC.

The output from the attitude sensor 131 is supplied to a data converting section 137 via an attitude data fetching section 136. The outputs from the GPS receiver 133 and time data converting section 134 are input to the data converting section 137 via a position-time data fetching section 138. The data converting section 137 performs a prescribed data-shaping process on the input data. The data, thus processed, is transferred to a data encoding section 139.

The data encoding section 139 encodes the input data. The data encoded is supplied to a record signal processing section 140. The section 140 processes the data, generating a signal that can be recorded on the recording medium. The signal is supplied to a signal recording section 141, which records the signal on the recording medium by means of digital recording.

In the image recording apparatus 130, the video signal is supplied from a video input section 142 to a video signal processing section 143. The section 143 performs a prescribed process on the video signal, which is supplied to the record signal processing section 140. The section 140 processes the video signal, generating a signal that can be recorded on the recording medium. This signal is supplied to the signal recording section 141, which records the signal on the recording medium by means of digital recording. An audio signal is supplied from an audio input section 144 to an audio signal processing section 145. The section 145 conducts a prescribed process on the audio signal, which is supplied to record signal processing section 140. The section 140 processes the audio signal, generating a signal that can be recorded on the recording medium. The signal is supplied from the section 140 to the signal recording section 141, which records the signal on the recording medium by means of digital recording. At the same time the video signal and the audio signal are recorded, the position data and the time data are recorded on the recording medium as has been described above.

The video recorder incorporated in this apparatus 130 is one of DV system, which is designated as a home-use digital VTR by the Counsel of HD Digital VCR. This video recorder records the position data and the time data, together with the audio signal and video signal, in the form of auxiliary data (AUX) or sub-code data on a recording track.

In the DV video recording system, two types of auxiliary data (AUX) can be recorded. The first type is video auxiliary data (VAUX), and the second type is audio auxiliary data (AAUX). The video auxiliary data (VAUX) may be the information that represents the mode of television broadcasting, the time of recording (year, month, day, minute and second), the data-recording mode, the subtitles, the particulars of copyright, and the like. The audio auxiliary data (AAUX) may be the information that represents the sampling frequency, the number of quantization bits, the time of recording (year, month, day, minute and second), the data-recording mode, the particulars of copyright, and the like. The sub-code data can be the time of recording (year, month, day, minute and second). In the image recording apparatus 130, the position data and the time data are recorded, replacing a part or all of, for example, the subtitle data or the copyright data which is the auxiliary data (AUX) or the sub-code data, either recorded on a recording track.

In the image recording apparatus 130, the signal recording section 141 can record the signals recorded on the recording medium. The signals reproduced by the section 141 are supplied to the record signal processing section 140. The section 140 effects a prescribed process on these signals. The video signal output from the section 140 is supplied to the video signal processing section 143, whereas the audio signal output from the section 140 is supplied to the audio signal processing section 145. The section 143 performs a specific process, such as decoding, on the video signal, thus generating an S-video signal. The audio signal processing section 145 conducts a specific process, such as decoding, on the audio signal, and then outputs the audio signal.

That part of the signal reproduced, which contained the position data and time data, is supplied from the record signal processing section 140 to a data decoding section 146. The data decoding section 146 decodes the signal that contains the position data and time data, thereby extracting the position data and the time data. The position data and the time data, both decoded, are supplied to a data shaping section 147. The data shaping section 147 performs a prescribed data-shaping process on the input data. The data, thus processed, is output from the image recording apparatus 130.

The image recording apparatus 130 comprises a digital signal input/output section 148 that is connected to the record signal processing section 140. Digital signals can be input to and output from the apparatus 130 through the digital signal input/output section 148. The interface used for input and output digital signals is, for example, IEEE1394.

As indicated above, the video recorder incorporated in this apparatus 130 is a conventional digital video recorder of DV system. That is, the video input section 142, video signal processing section 143, audio input section 144, audio signal processing section 145, record signal processing section 140, and signal recording section 141 are almost identical to their counterparts of the conventional video recorder of DV system.

Figure 14:
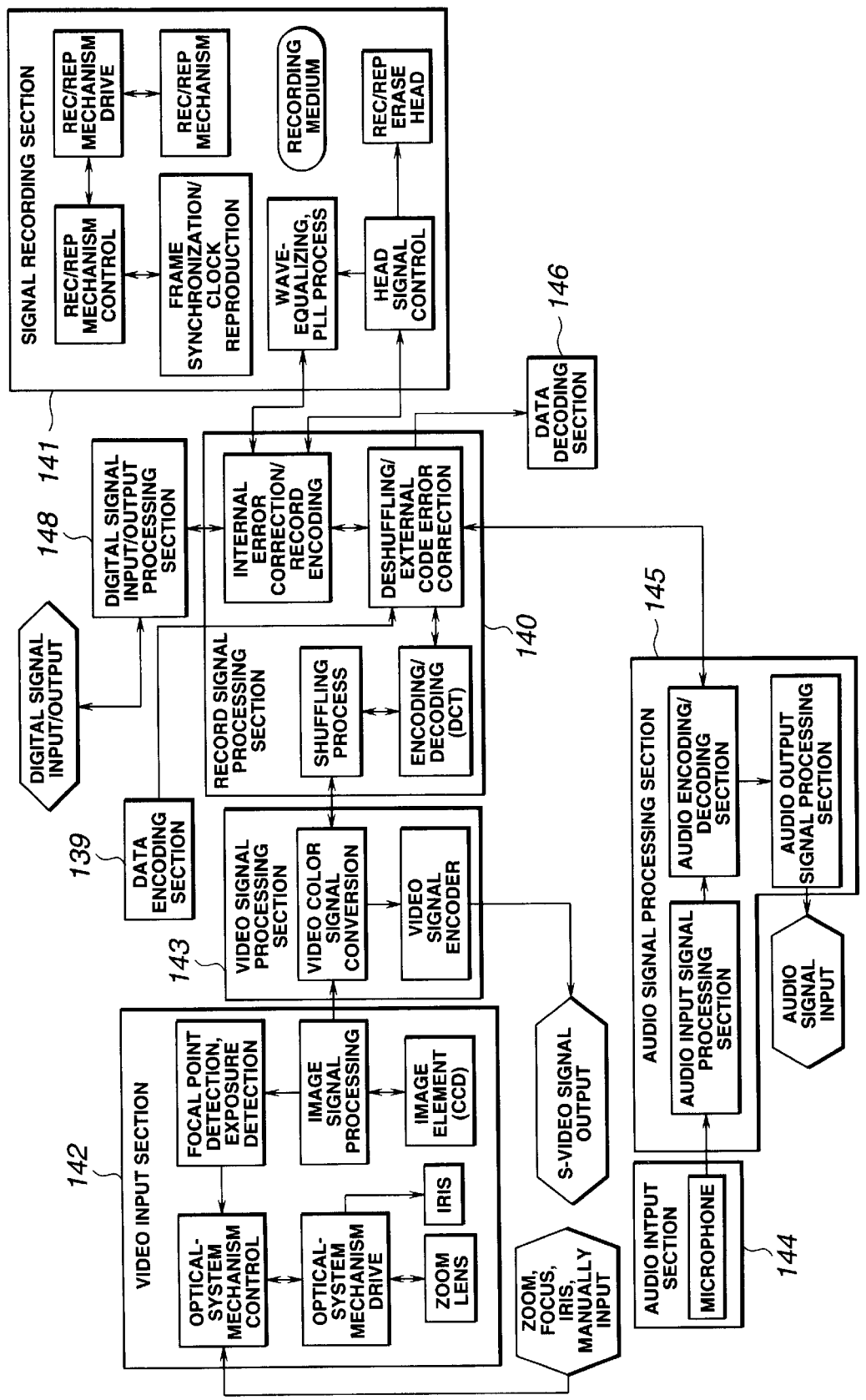
FIG. 14 is a block diagram showing the conventional digital video recording apparatus used in the image recording apparatus shown in FIG. 13.

FIG. 14 shows these sections in detail. As can be understood from FIG. 14, the sections are identical to those of the conventional digital video recorder of the DV system, except for two respects. First, the position data and time data are input from the data encoding section 139 to the record signal processing section 140, so as to record image data. Second, the position data and time data are supplied from the record signal processing section 140 to the data decoding section 146, so as to reproduce the image data.

1-1-1-3 Third Configuration

Figure 15:
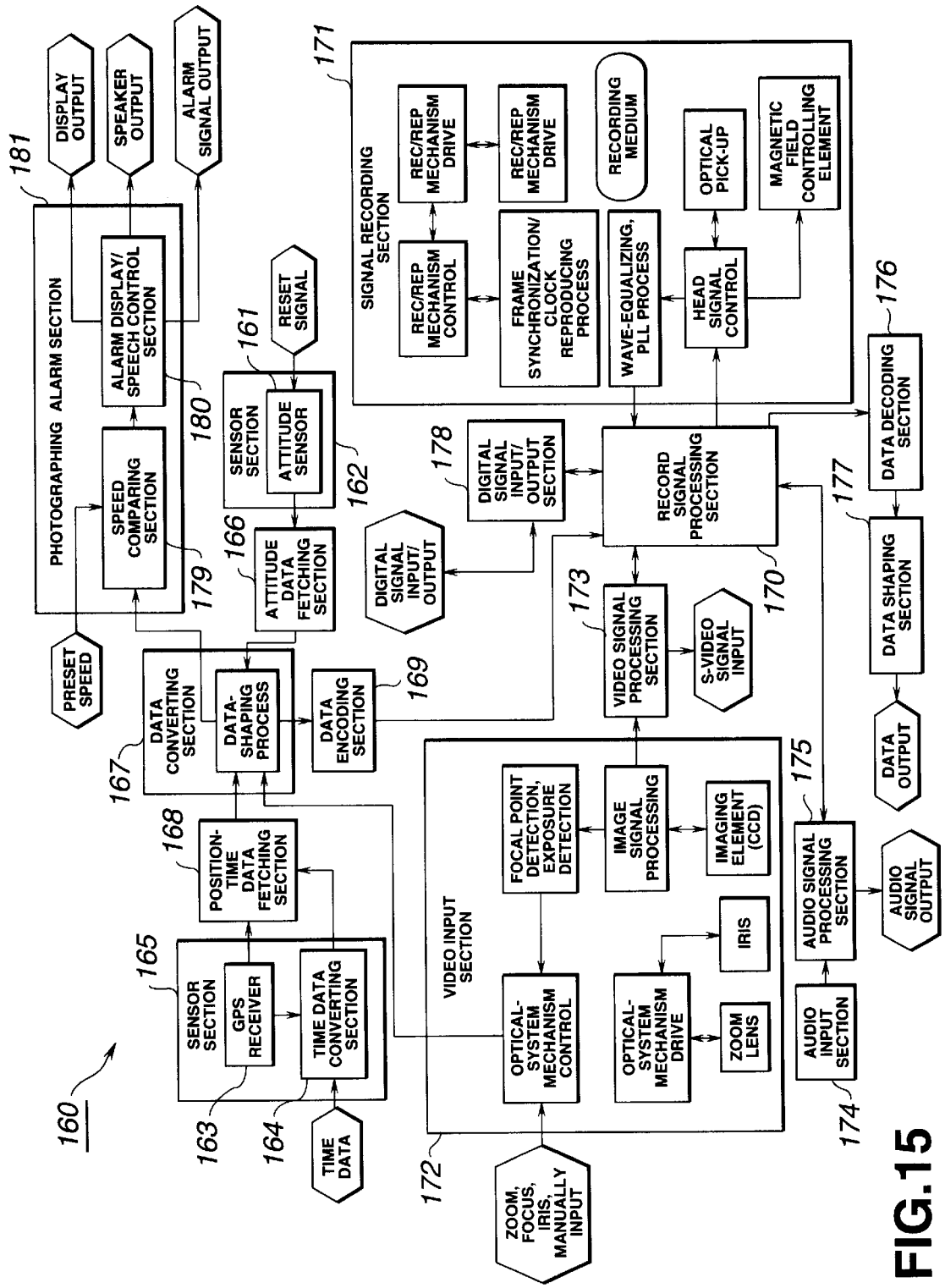
FIG. 15 is a block diagram illustrating another image recording apparatus according to this invention.

FIG. 15 shows the third configuration of an image recording apparatus that comprises a digital video recorder. The video recorder incorporated in this apparatus 160 is a digital video recorder of DV system, which uses an photomagnetic disk as recording medium. The apparatus 160 can record position data, time data and the like in the added data part or video-signal part of a data packet.

This image recording apparatus 160 is different from the image recording apparatus 130 in that the information about the optical system used can be recorded and that the recording medium used is a photomagnetic disk. In all other respects the apparatus 160 is almost the same as the image recording apparatus 130. The image recording apparatus 160 will be described below, centering on the sections that differ form their equivalents of the apparatus 130.

The image recording apparatus 160 comprises a first sensor section 162 and a second sensor section 165. The first sensor section 162 incorporates an attitude sensor 161. The second sensor section 165 incorporates a GPS receiver 163 and a time data converting section 164. The sensor sections 162 and 165 detect the motion of the video camera that is freely moving and also detect the time when the video camera takes pictures of an object (not shown). The sensor sections 162 and 165 generate position data and time data, which will be recorded on the recording medium.

The attitude sensor 161 incorporates three vibratory gyroscopes and three acceleration sensors, which cooperate to detect a distance and direction with respect to a predetermined reference point. The attitude sensor 161 generates position data that represents both the distance and the direction. The position data will be recorded. Position data of a different scale, obtained by the GPS and representing the latitude, longitude and altitude, will be recorded, too. Further, time data representing the Universal Time Coordinate calibrated by the GPS, will be recorded.

The attitude sensor 161, which has three vibratory gyroscopes and three acceleration sensors, outputs digital data that represents the inclination angle, bearing angle (roll, pitch, and yaw) and acceleration. If necessary, a reset signal representing a reference point is manually input to the attitude sensor 161.

The image recording apparatus 160 comprises a GPS receiver 163 for generating position data of a different scale. The GPS receiver 163 receives waves of a 1575.42 MHz (L1)C/A code from the GPS satellites and also receives the D-GPS signal (Differential-GPS) signal (e.g., error-correction data RTCM-SC104 transmitted through FM-teletext broadcasting by Kabushiki Kaisha Satellite Measuring Information Center). The GPS receiver 163 outputs latitude-longitude-altitude data that is accurate to a few meters, in the form of digital data of, for example, the NMEA-0183 format.

The GPS receiver 163 receives waves from the GPS satellites and generates, as time data, a 1 Hz pulse signal that is synchronized with the UTC (Universal Time Coordinate) at the leading edge. This pulse signal is input to a data converting section 164. The data converting section 164 also receives the time data manually or automatically input, i.e., the year, month, day, hour, minute and second. The section 164 compares the time data with the time measured by the internal clock and generates date data and time data, both being synchronous with the UTC.

The output from the attitude sensor 161 is supplied to a data converting section 167 via an attitude data fetching section 166. The outputs from the GPS receiver 163 and time data converting section 164 are input to the data converting section 167 via a position-time data fetching section 168.

The image recording apparatus 160 records data items other than the position data and the time data, both described above. The other data items are view-angle data (zooming value), focal distance data (focal distance adjusting value), exposure, diaphragm data (iris F value, digital shutter value), and the like. Hereinafter these data items shall be referred to as optical system data. The optical system data is supplied to the data converting section 167 from the unit that controls a video input section 172.

The data converting section 167 performs a prescribed data-shaping process on the position data generated by the first sensor section 162, the position data and time data generated by the second sensor section 165, and the optical system data supplied from the video input section 172. The data items, thus processed, are transferred to a data encoding section 169.

The data items encoded by the data encoding section 169 are supplied to a record signal processing section 170. The record signal processing section 170 processes the data items, generating a signal that can be recorded on the recording medium. The signal is supplied to a signal recording section 171. The section 171 records the signal supplied from the section 170 on the recording medium, by means of digital recording. Since the recording medium is a photo-magentic disk, the section 171 has a recording device that comprises an optical pickup and a magnetic field generating element.

In the image recording apparatus 160, the video signal is supplied from the video input section 172 to a video signal processing section 173. The section 173 processes the video signal, which is input to the record signal processing section 170. The section 170 processes the video signal, generating a signal that can be recorded on the recording medium. This signal is supplied to the signal recording section 171. The section 171 records the signal on the recording medium, by means of digital recording. Meanwhile, an audio signal is supplied from an audio input section 174 to an audio signal processing section 175. The audio signal processing section 175 conducts a prescribed audio processing on the audio signal, which is input to the record signal processing section 170. The section 170 processes the audio signal, generating a signal that can be recorded on the recording medium. This signal is supplied to the signal recording section 171. The section 171 records the signal on the recording medium, by means of digital recording. When the video signal and the audio signal are so recorded, the position data, time data and optical system data are also recorded on the recording medium.

The video recorder incorporated in this apparatus 160 is one of DV system, as mentioned above. The DV system is a home-use digital VTR designated by the Counsel of HD Digital VCR. The position data, time data and optical system data are recorded, together with the audio signal and video signal, in the form of auxiliary data (AUX) or sub-code data on a recording track.

In the DV video recording system, two types of auxiliary data (AUX) can be recorded. The first type is video auxiliary data (VAUX), and the second type is audio auxiliary data (AAUX). The video auxiliary data (VAUX) may be the information that represents the mode of television broadcasting, the time of recording (year, month, day, minute and second), the data-recording mode, the subtitles, the particulars of copyright, and the like. The audio auxiliary data (AAUX) may be the information that represents the sampling frequency, the number of quantization bits, the time of recording (year, month, day, minute and second), the data-recording mode, the particulars of copyright, and the like. The sub-code data can be the time of recording (year, month, day, minute and second).

In the image recording apparatus 160, the position data and the time data are recorded, replacing a part or all of, for example, the subtitle data or the copyright data which is the auxiliary data (AUX) or the sub-code data, either recorded on a recording track. In the present embodiment, the optical system data can be recorded in the auxiliary data (AUX) or the sub-code data, along with the position data and time data that are recorded in the second configuration.

In the image recording apparatus 160, the data converting section 167 can find the absolute direction (the optical axis of the object) on the basis of the position data generated by the sensor sections 162 and 165 and the optical system data supplied from the video input section 172. The data representing this absolute direction may be recorded as position data.

In the image recording apparatus 160, the signal recording section 171 can reproduce the signals recorded on the recording medium. Any signal reproduced by the signal recording section 171 is supplied to the record signal processing section 170. The section 170 performs a prescribed process on the signal, generating a video signal and an audio signal. The video signal is supplied to the video signal processing section 173, while the audio signal is supplied to the audio signal processing section 175. The section 173 performs a specific process, such as decoding, on the video signal, thus generating an S-video signal. The audio signal processing section 175 conducts a specific process, such as decoding, on the audio signal, and then outputs the audio signal.

That part of the signal reproduced, which contained the position data and time data, is supplied from the record signal processing section 170 to a data decoding section 176. The data decoding section 176 decodes the signal that contains the position data and time data, thereby extracting the position data and the time data. The position data and the time data, both decoded, are supplied to a data shaping section 177. The data shaping section 177 performs a prescribed data-shaping process on the input data. The data, thus processed, is output from the image recording apparatus 160.

The image recording apparatus 160 comprises a digital signal input/output section 178 that is connected to the record signal processing section 170. Digital signals can be input to and output from the apparatus 160 through the digital signal input/output section 178. The interface used for input and output digital signals is, for example, IEEE1394.

The image recording apparatus 160 comprises a photo-graphing alarm section 181. The section 181 comprises a speed comparing section 179 and an alarm display/speech control section 180. The speed comparing section 179 calculates the speeds at which the camera is moving and rotating, from the position data and time data generated by the sensor sections 162 and 165. The section 179 then determines whether these speeds are equal to or higher than reference values. The reference values have been input manually.

If the section 179 determines that the speeds are equal to or higher than the reference values, the alarm display/speech control section 180 generates an alarm instructing that the camera should be moved more slowly, and also an alarm instructing that the camera should take pictures again. The alarm generated by the section 180 may be displayed by a display, issued by a speaker, or supplied to an external device.

Figure 16:
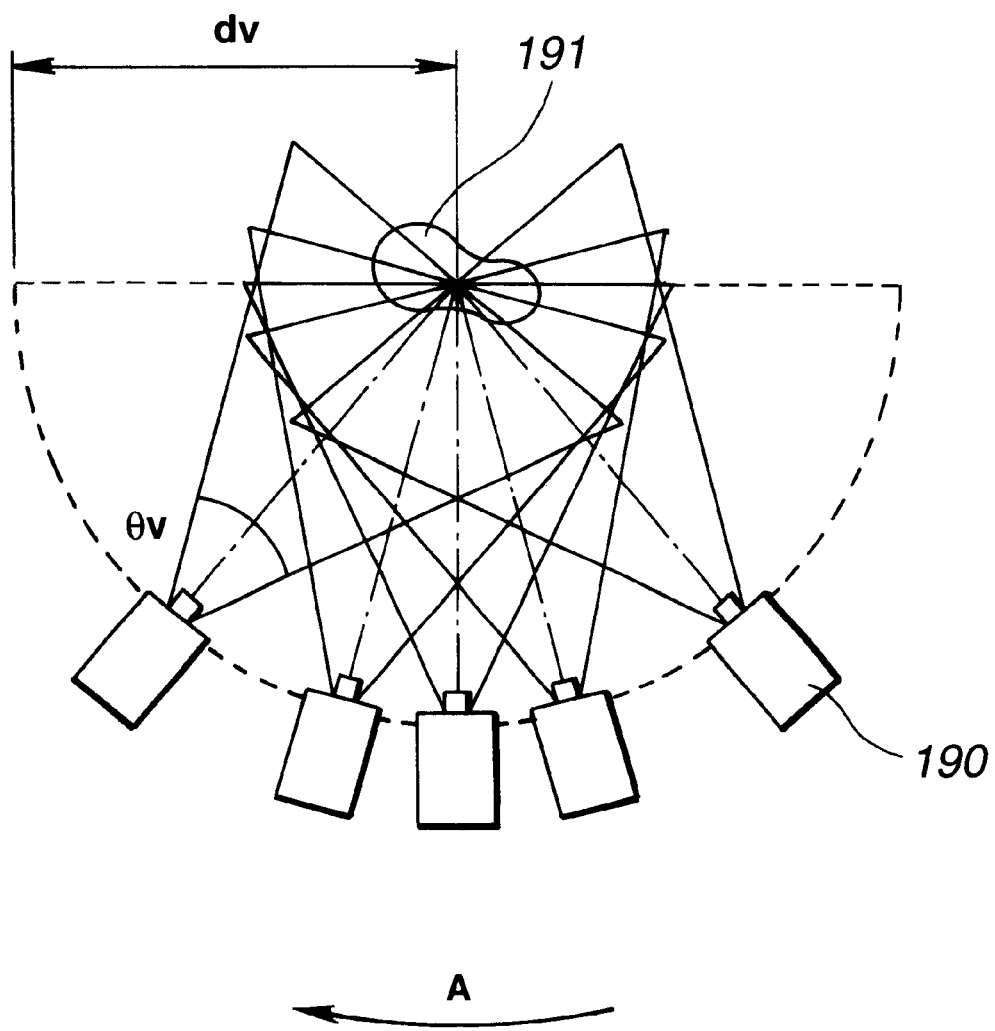
FIG. 16 is a schematic representation of the positional relation between the camera and an object, the camera being moved around the object to take pictures of the object.

The image recording apparatus 160 records the view-angle data, the focal distance data, and the like, as the image data is recorded. The image data can therefore be subjected to viewpoint transformation using the view-angle data, the focal distance data, and the like, thereby converting the image data to a train of parallax images. The train of parallax image may be processed to prepare a holographic stereogram. As shown in FIG. 16, the camera 190 may take pictures of an object 191, while moving in the direction of arrow A. If this case, Keaston deformation is corrected, and images for element hologram exposure are formed, on the basis of the view-angle $\theta v$ and the focal distance dv. Such viewpoint transformation is disclosed in Japanese Patent Application No. 8-170021 (Jpn. Pat. Appln. Laid-open Publication No. 10-20755) and the like.

The image recording apparatus 160 generates an alarm when the speeds at which the camera is moving and rotating becomes higher than the reference values. The alarm serves to prevent the image from deteriorating when the camera 190 obtains but an insufficient number of parallax images. The angle through which the camera 190 rotates and the distance for which the camera 190 moves to obtain a train of parallax images can be easily estimated, unless they are limited by the rails or the like. This is because the view angle applied in the process of reproducing a holographic stereogram can be determined from the geometrical relation between the camera 190 and the object 191. It is difficult, however, to estimate the number of parallax images the camera 190 may provide.

Figure 17A:
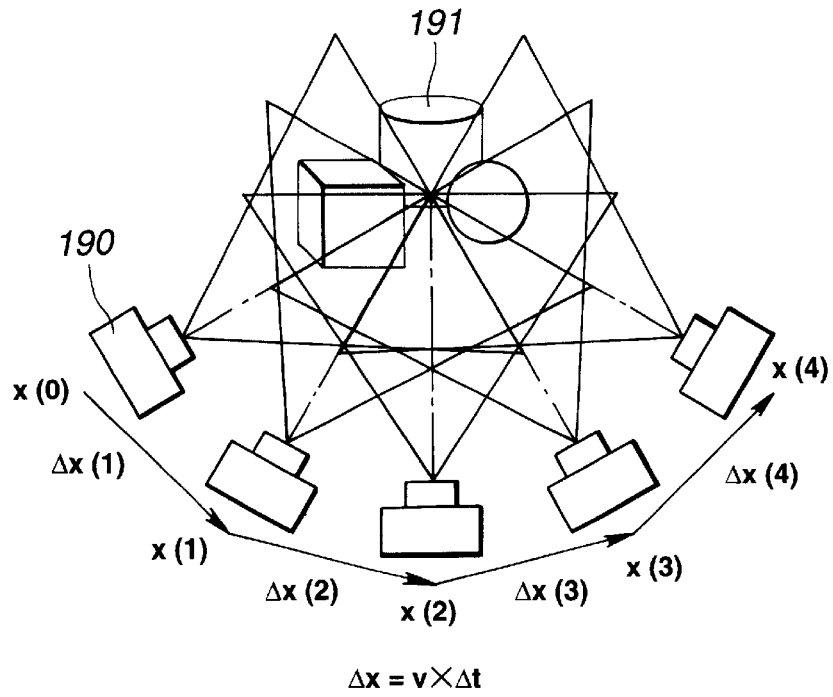
FIG. 17A is a diagram for explaining how the camera takes pictures of the object, while being moved slowly around the object.
Figure 17B:
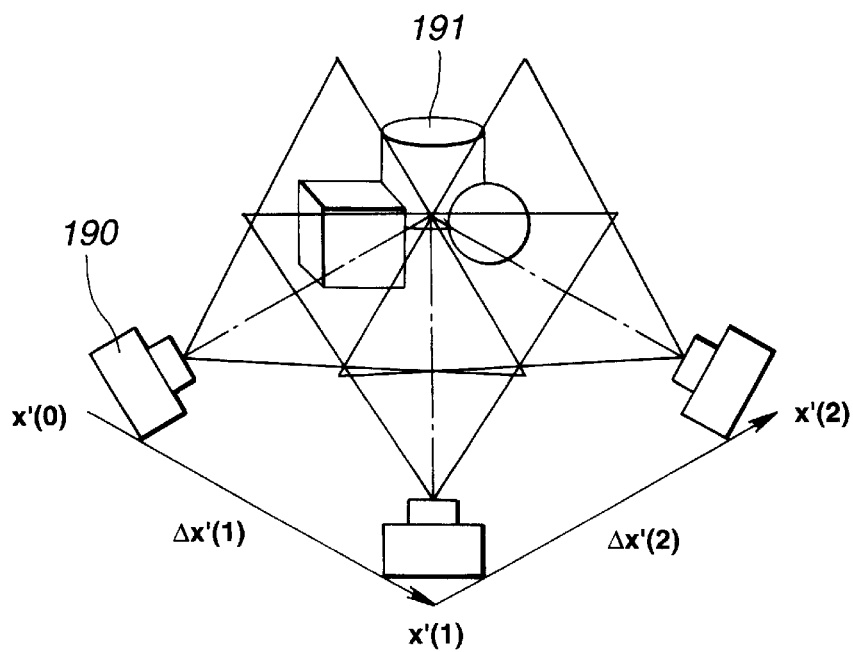
FIG. 17B is a diagram for explaining how the camera takes pictures of the object, while being moved fast around the object.

Assume that the camera 190 takes pictures of the object 191, while moving slowly around the object 191 as is illustrated in FIG. 17A. If this is the case, the camera 190 can provide a number of parallax images, which is large enough to reproduce a high-quality stereogram. If the camera 190 moves fast around the object 191, providing but an insufficient number of parallax images, as is shown in FIG. 17B, however, the resultant stereogram will inevitably deteriorate in quality.

To obtain a moving picture of the object 191, the camera 190 takes pictures of the object 191 at a predetermined frame frequency of, for example, about 60 Hz, in the case where the camera 190 is an NTSC camera or an HDTV camera. The photographing intervals $\Delta t$ are therefore constant. The positional relation $\Delta x$ between any two parallax images taken depends on the speed v of the camera 190 that is moving. The speed v of the camera 190 is monitored, thereby maintaining the speed v at or below a predetermined value. This measure taken, a sufficient number of parallax images can be obtained, making it possible to reproduce a high-quality stereogram.

1-1-1-4 Fourth Configuration

Figure 18:
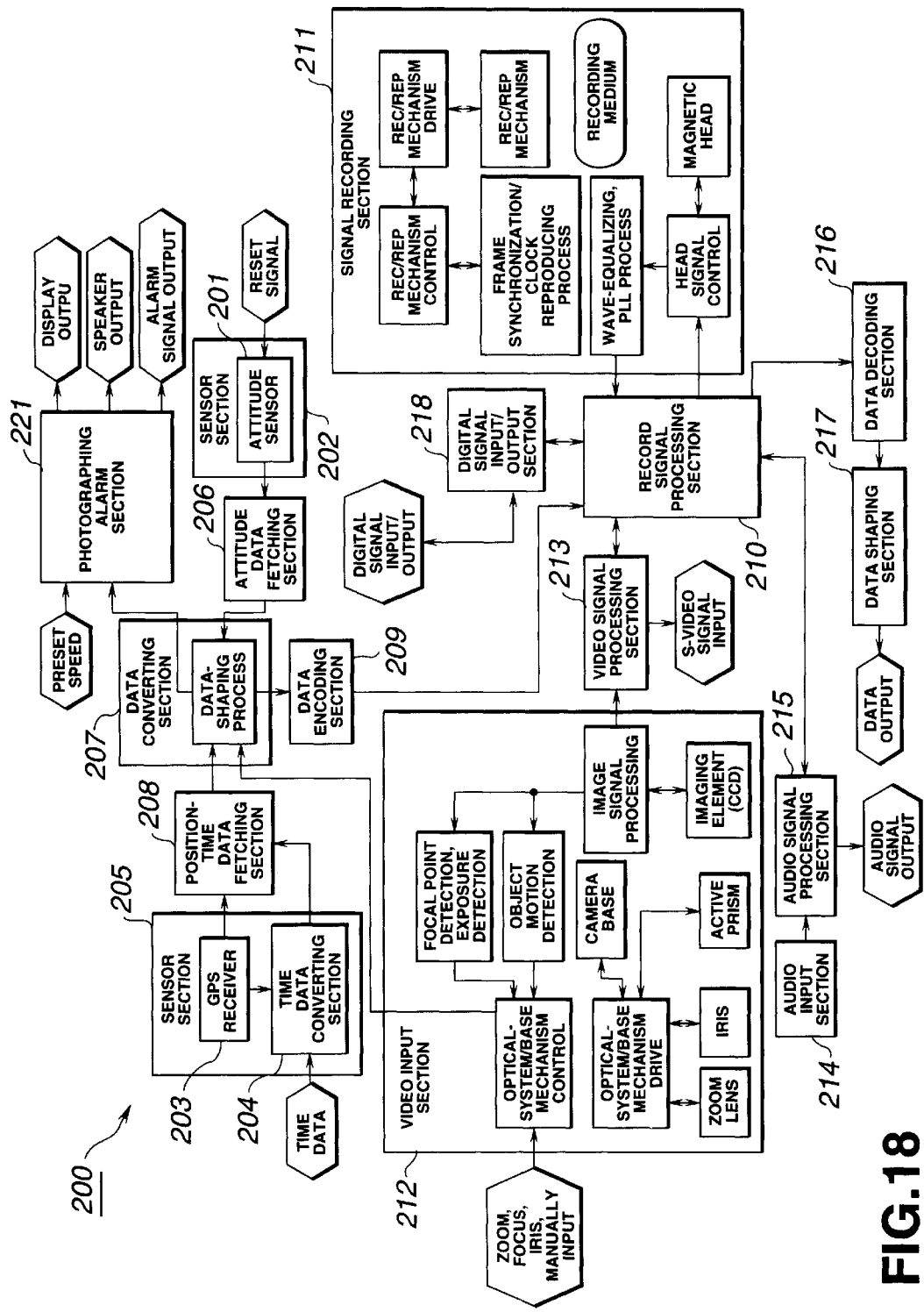
FIG. 18 is a block diagram illustrating an image recording apparatus according to the present invention.

FIG. 18 shows the fourth configuration of an image recording apparatus that comprises a digital video recorder. The video recorder incorporated in this apparatus 200 is a digital video recorder of DV system, too, which uses a magnetic disk as recording medium. The apparatus 200 can record position data, time data and the like in the added data part or video-signal part of a data packet.

This image recording apparatus 200 comprises a video input section 212. The video input section 121 has an unintentional camera-motion compensating mechanism and an object tracking mechanism. The section 212 can therefore compensate for the hand motion and track an object. More precisely, the section 212 can compensate for small motions of the camera, other than the intentional motion with respect to the object (e.g., side-way vibration and small vertical motion). The image recording apparatus 200 is different from the image recording apparatus 160 in two respects. First, it records the data representing the unintentional motion of the camera, when the unintentional motion is compensated and the object is tracked. Second, it uses a magnetic disk as recording medium. In all other respects, the apparatus 200 is almost the same as the image recording apparatus 160. The image recording apparatus 200 will be described below, centering on the sections that differ form their equivalents of the apparatus 160.

The image recording apparatus 200 comprises a first sensor section 202 and a second sensor section 205. The first sensor section 202 incorporates an attitude sensor 201. The second sensor section 205 incorporates a GPS receiver 203 and a time data converting section 204. The sensor sections 202 and 205 detect the motion of the video camera that is freely moving and also detect the time when the video camera takes pictures of an object (not shown). The sensor sections 202 and 205 generate position data and time data, which will be recorded on the recording medium.

The attitude sensor 201 incorporates three vibratory gyroscopes and three acceleration sensors, which cooperate to detect a distance and direction with respect to a predetermined reference point. The attitude sensor 201 generates position data that represents both the distance and the direction. The position data will be recorded. Position data of a different scale, obtained by the GPS and representing the latitude, longitude and altitude, will be recorded, too. Further, time data representing the Universal Time Coordinate calibrated by the GPS, will be recorded.

The attitude sensor 201, which has three vibratory gyroscopes and three acceleration sensors, outputs digital data that represents the inclination angle, bearing angle (roll, pitch, and yaw) and acceleration. If necessary, a reset signal representing a reference point is manually input to the attitude sensor 201.

The image recording apparatus 200 comprises a GPS receiver 203 for generating position data of a different scale. The GPS receiver 203 receives waves of a 1575.42 MHz (L1)C/A code from the GPS satellites and also receives the D-GPS signal (Differential-GPS) signal (e.g., error-correction data RTCM-SC104 transmitted through FM-teletext broadcasting by Kabushiki Kaisha Satellite Measuring Information Center). The GPS receiver 203 outputs latitude-longitude-altitude data that is accurate to a few meters, in the form of digital data of, for example, the NMEA-0183 format.

The GPS receiver 203 receives waves from the GPS satellites and generates, as time data, a 1 Hz pulse signal that is synchronized with the UTC (Universal Time Coordinate) at the leading edge. This pulse signal is input to a data converting section 204. The data converting section 204 also receives the time data manually or automatically input, i.e., the year, month, day, hour, minute and second. The section 204 compares the time data with the time measured by the internal clock and generates date data and time data, both being synchronous with the UTC.

The output from the attitude sensor 201 is supplied to a data converting section 207 via an attitude data fetching section 206. The outputs from the GPS receiver 203 and time data converting section 204 are input to the data converting section 207 via a position-time data fetching section 208.

The image recording apparatus 200 records data items other than the position data and the time data, both described above. The other data items are view-angle data (zooming value), focal distance data (focal distance adjusting value), exposure, diaphragm data (iris F value, digital shutter value), axis-change data (changes in the optical axis of the active prism, due to the deforming of the prism), rotation data showing the rotation of the camera base, and the like. Hereinafter, these data items shall be referred to as ptical system data and ase data. The optical system data and the base data are supplied to the data converting section 207 from the unit that controls the optical system mechanism and the base mechanism provided in a video input section 212.

The data converting section 207 performs a prescribed data-shaping process on the position data generated by the first sensor section 202, the position data and time data generated by the second sensor section 205, and the optical system data and base data supplied from the video input section 212. The data items, thus processed, are transferred to a data encoding section 209.

The data items encoded by the data encoding section 209 are supplied to a record signal processing section 210. The record signal processing section 210 processes the data items, generating a signal that can be recorded on the recording medium. The signal is supplied to a signal recording section 211. The section 211 records the signal supplied from the section 210 on the recording medium, by means of digital recording. Since the recording medium is a magnetic disk, the section 211 has a recording device that comprises a magnetic head.

In the image recording apparatus 200, the video signal is supplied from the video input section 212 to a video signal processing section 213. The section 213 processes the video signal, which is input to the record signal processing section 210. The section 210 processes the video signal, generating a signal that can be recorded on the recording medium. This signal is supplied to the signal recording section 211. The section 211 records the signal on the recording medium, by means of digital recording. Meanwhile, an audio signal is supplied from an audio input section 214 to an audio signal processing section 215. The audio signal processing section 215 conducts a prescribed audio processing on the audio signal, which is input to the record signal processing section 210. The section 210 processes the audio signal, generating a signal that can be recorded on the recording medium. This signal is supplied to the signal recording section 211. The section 211 records the signal on the recording medium, by means of digital recording. When the video signal and the audio signal are so recorded, the position data, time data, optical system data and base data are also recorded on the recording medium.

The video recorder incorporated in this apparatus 200 is one of DV system, as mentioned above. The DV system is a home-use digital VTR designated by the Counsel of HD Digital VCR. The position data, time data and optical system data are recorded, together with the audio signal and video signal, in the form of auxiliary data (AUX) or sub-code data on a recording track.

In the DV video recording system, two types of auxiliary data (AUX) can be recorded. The first type is video auxiliary data (VAUX), and the second type is audio auxiliary data (AAUX). The video auxiliary data (VAUX) may be the information that represents the mode of television broadcasting, the time of recording (year, month, day, minute and second), the data-recording mode, the subtitles, the particulars of copyright, and the like. The audio auxiliary data (AAUX) may be the information that represents the sampling frequency, the number of quantization bits, the time of recording (year, month, day, minute and second), the data-recording mode, the particulars of copyright, and the like. The sub-code data can be the time of recording (year, month, day, minute and second). Therefore, in the image recording apparatus 200, the position data, time data, optical system data and base data are recorded, replacing a part or all of, for example, the subtitle data or the copyright data which is the auxiliary data (AUX) or the sub-code data, either recorded on a recording track.

In the present embodiment, the optical system data and the base data are recorded in the auxiliary data (AUX) or the sub-code data, along with the position data and time data that are recorded in the second configuration. Moreover, the axis-change data (changes in the optical axis of the active prism, due to the deforming of the prism), the rotation data showing the rotation of the camera base, and the like are recorded, in addition to the data items recorded in the third configuration. In other words, in the image recording apparatus 200, the motion of the object is detected from the images photographed of the object, the active prism serves to compensate for the unintentional motion of the camera, and the base moves to tack the object. Further, the axis-change data, the rotation data, and the like are recorded, too.

The method of tracking the object is disclosed in, for example, Japanese Patent Application No. 7-151025 (Jpn. Pat. Appln. Laid-open Publication No. 8-51564) and the like. To compensate for the unintentional motion of the camera, various methods other than the use of an active prism may be utilized. An example is ABS method in which the lens in the photographing optical system is moved in a direction at right angles to the optical axis of the system to compensate for the unintentional motion of the camera. Another example is Zimbal method in which the lens is rotated in a direction at right angles to the optical axis. Still another example is a combination of the ABS method and the Zimbal method. The ABS-Zimbal method is disclosed in, for example, Japanese Patent Application No. 6-129849 (Jpn. Pat. Appln. Laid-open Publication No. 7-318864) and the like.

In the image recording apparatus 200, the signal recording section 211 can reproduce the signals recorded on the recording medium. Any signal reproduced by the signal recording section 211 is supplied to the record signal processing section 210. The section 210 performs a prescribed process on the signal, generating a video signal and an audio signal. The video signal is supplied to the video signal processing section 213, while the audio signal is supplied to the audio signal processing section 215. The section 213 performs a specific process, such as decoding, on the video signal, thus generating an S-video signal. The audio signal processing section 215 conducts a specific process, such as decoding, on the audio signal, and then outputs the audio signal.

That part of the signal reproduced, which contained the position data and time data, is supplied from the record signal processing section 210 to a data decoding section 216. The data decoding section 216 decodes the signal that contains the position data and time data, thereby extracting the position data, the time data, the optical system data, and the base data. The position data, time data, optical system data and base data, all decoded, are supplied to a data shaping section 217. The data shaping section 217 performs a prescribed data-shaping process on the input data. The data, thus processed, is output from the image recording apparatus 200.

The image recording apparatus 200 comprises a digital signal input/output section 218 that is connected to the record signal processing section 210. Digital signals can be input to and output from the apparatus 200 through the digital signal input/output section 218. The interface used for input and output digital signals is, for example, IEEE1394.

The image recording apparatus 200 comprises a photographing alarm section 221. Like the photographing alarm section 181 of the image recording apparatus 160 described above, the section 221 detects the speeds at which the camera is moving and rotating. If these speeds are equal to or higher than reference values, the alarm section 221 generates an alarm instructing that the camera should be moved more slowly or an alarm instructing that the camera should take pictures again.

2-2-3 Apparatus with a Plurality of Video Audio Input Sections

Figure 19:
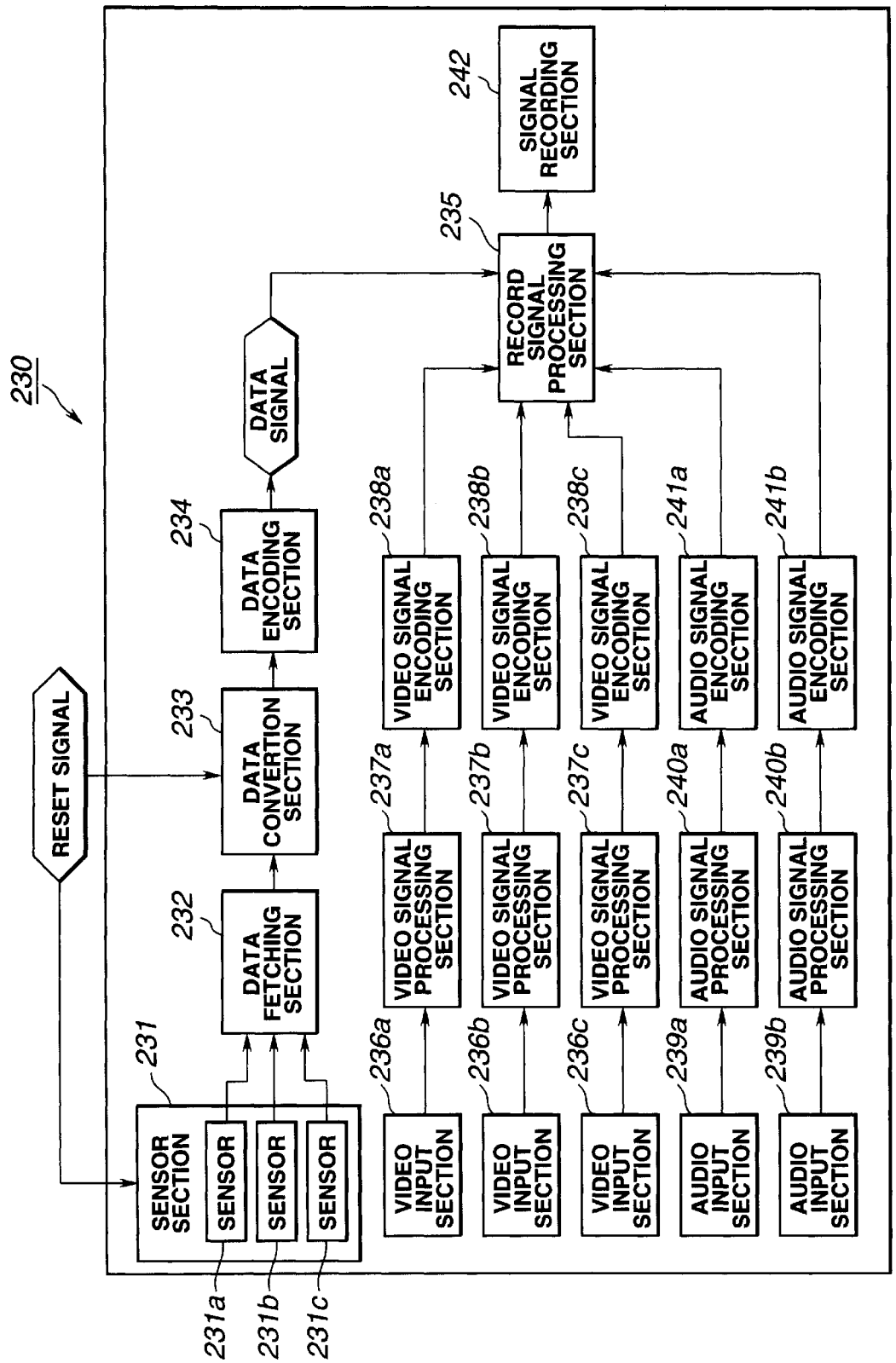
FIG. 19 is a block diagram showing another image recording apparatus according to the invention.

The embodiments described above have one video input section and one audio input section. Nonetheless, the image recording apparatus according to this invention may have a plurality of video input sections and a plurality of audio input sections. Such an apparatus will be described with reference to FIG. 19.

This image recording apparatus 230 comprises a digital video recorder and can therefore record position data in the added data part or video-signal part of a data packet.

The image recording apparatus 230 comprises a sensor section 231 for detecting the translational or rotational motion of the video camera. The sensor section 231 incorporates a plurality of sensors 231a, 231b and 231c for detecting the translational or rotational motion of the video camera. The detection signals output from the sensors 231a, 231b and 231c are converted to digital detection data by means of analog-to-digital conversion. The digital detection data is supplied via a data fetching section 232 to a data converting section 233. The data converting section 233 converts the detection data generated by the sensor section 231, which represents a motion of the video camera, which is relative to an object (not shown), to data representing an absolute motion of the video camera. The section 233 also performs an operation on the data items output from the sensors 231a, 231b and 231c and compare these data items. Further, the section 233 converts the position data showing the translational or rotational motion of the video camera to a data packet for each unit time, multiplexed in a prescribed format. To convert the detection data obtained by the sensor section 231 and representing the relative motion of the video camera, to the data representing the absolute motion thereof, a position reset signal may be externally and manually input in order to provide a reference point.

The data packet generated by the data converting section 233 and output therefrom is supplied to a data encoding section 234. The section 234 converts the data packet to a signal that can be recorded on a recording medium. The signal thus obtained is supplied to a record signal processing section 235.

The image recording apparatus 230 comprises three video input sections 236a, 236b and 236c, which work as a video input unit. The apparatus 230 further comprises two audio input sections 239a and 239b, which work an audio input unit.

A video signal is supplied from the first video input section 236a to a first video signal processing section 237a. The first video signal processing section 237a processes the video signal, which is supplied to a first video signal encoding section 238a. The first video signal encoding section 238a encodes the video signal into a digital signal. The digital signal is supplied to the record signal processing section 235.

Likewise, a video signal is supplied from the second video input section 236b to a second video signal processing section 237b. The second video signal processing section 237b processes the video signal, which is supplied to a second video signal encoding section 238b. The second video signal encoding section 238b encodes the video signal into a digital signal. The digital signal is supplied to the record signal processing section 235.

Similarly, a video signal is supplied from the third video input section 236c to a third video signal processing section 237c. The third video signal processing section 237c processes the video signal, which is supplied to a third video signal encoding section 238c. The third video signal encoding section 23c encodes the video signal into a digital signal. The digital signal is supplied to the record signal processing section 235.

An audio signal is supplied from the first audio input section 239a to a first audio signal processing section 240a. The first audio signal processing section 240a processes the audio signal, which is supplied to a first audio signal encoding section 241a. The first audio signal encoding section 241a encodes the audio signal into a digital signal. The digital signal is supplied to the record signal processing section 235.

Similarly, an audio signal is supplied from the second audio input section 239b to a second audio signal processing section 240b. The second audio signal processing section 240b processes the audio signal, which is supplied to a second audio signal encoding section 241b. The second audio signal encoding section 241b encodes the audio signal into a digital signal. The digital signal is supplied to the record signal processing section 235.

The record signal processing section 235 processes the data supplied to it, generating a digital signal of a prescribed format, which can be recorded on the recording medium. The signal is supplied to a signal recording section 242. The signal recording section 242 records the signal, which has been supplied from the record signal processing section 235, on the recording medium.

In the image recording apparatus 230 comprising a plurality of video input sections 236a, 236b and 236c, three different position data items may be recorded on the recording medium, for the video signals supplied from the video input sections 236a, 236b and 236c, respectively. Alternatively, one representative position data item may be recorded on the recording medium for all video signals and three relative-position data items may be recorded for the three video signals, respectively.

The image recording apparatus 230 has three video input sections 236a, 236b and 236c and two audio input sections 239a and 239b. Nevertheless, the number of video input sections and the number of audio input sections are not limited to these. Needless to say, the video input sections and the audio input sections may be provided in smaller or larger numbers, if necessary.

Figure 20:
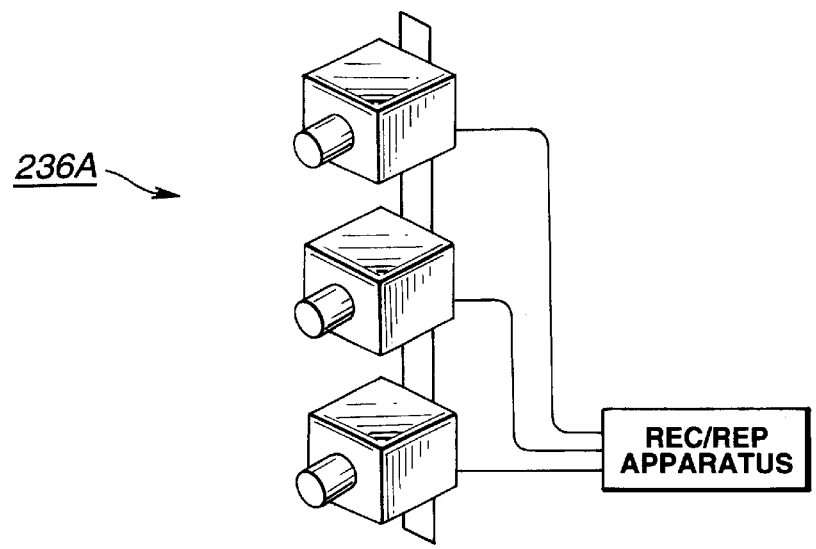
FIG. 20 is a diagram showing a plurality of audio input sections and video input sections which are arranged in a one-dimensional fashion.
Figure 21:
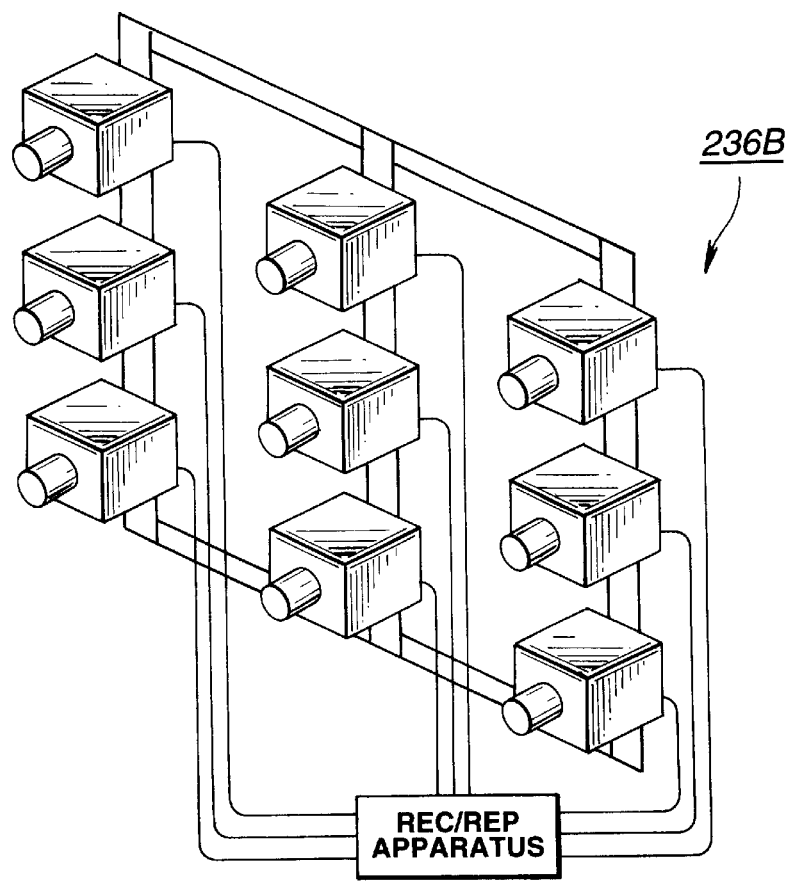
FIG. 21 is a diagram showing a plurality of audio sections units and video input sections, which are arranged in a two-dimensional fashion.

Moreover, the video input sections and the audio input sections may be arranged in a one-dimensional fashion, as is illustrated in FIG. 20. Alternatively, the video input sections and audio input sections may be arranged in a two-dimensional fashion, as is shown in FIG. 21. Further, they may be arranged in a space, or in a three-dimensional fashion.

What is claimed is:

1. An image recording apparatus comprising:

camera means for generating image data of an object;

position detecting means for detecting relative motion data of the camera means with respect to the object;

converting means for converting the relative motion data of the camera into a multiplexed data packet containing a data packet for each unit time, each data packet of the multiplexed data packet including absolute motion data of the camera based on a predetermined reference point;

multiplexing means for processing the multiplexed data packet and generating a video signal having the data of the processed data packet superposed onto the image data;

modulating means for superposing the data of the processed data packet onto an audio signal; and recording means for generating a recording signal based on the video signal and the superposed audio signal, and recording the recording signal onto a recording medium.

2. The image recording apparatus according to claim 1, wherein the recording means records position data with all or some of the images the camera means has generated.

3. The image recording apparatus according to claim 1, further comprising:

time data recording means for recording time data when the camera means generates images of the object.

4. The image recording apparatus according to claim 3, wherein the time data recording means records time data items in association with all or some of the images the camera means has generated.

5. The image recording apparatus according to claim 1, further comprising:

optical system data recording means for recording data about an optical system that the camera means uses, when the camera means generates images of the object.

6. The image recording apparatus according to claim 5, wherein the optical system data recording means records optical system data items in association with all or some of the images the camera means has generated.

7. The image recording apparatus according to claim 1, further comprising:

alarm means for generating an alarm in the form of a visual or an aural message when the camera means moves at a speed equal to or higher than a predetermined value while generating images of the object, said alarm indicates that the camera means be moved more slowly and/or that the camera means be operated again to take pictures.

8. The image recording apparatus according to claim 1, further comprising:

interpolating means for interpolating position data not recorded with respect to a selected portion of the image data, from the image data preceding the selected portion and the image data following the selected portion.

9. The image recording apparatus according to claim 3, further comprising:

interpolating means for interpolating time data not recorded with respect to a current portion of the image data from the image data preceding the current portion and the image data following the current portion.

10. The image recording apparatus according to claim 2, wherein the position data is recorded as a watermark.

11. A method for recording an image, comprising:

generating image data of an object through a camera device;

detecting relative motion data of the camera device with respect to the object;

converting the relative motion data of the camera into a multiplexed data packet containing data packets for each unit time, each data packet of the multiplexed data packet including absolute motion data of the camera based on a predetermined reference point;

processing the multiplexed data packet and generating a video signal having the processed data packet superposed onto the image data;

superposing the processed data packet onto an audio signal;

generating a recording signal based on the video signal and the superposed audio signal; and recording the recording signal onto a recording medium.

12. The method for recording an image according the claim 11, further comprising:

recording time data when the camera means generates images of the object.

* * * * *